US009264208B2

(12) United States Patent
Chen et al.

(10) Patent No.: US 9,264,208 B2
(45) Date of Patent: Feb. 16, 2016

(54) DOWNLINK CONTROL WITH CONTROL-LESS SUBFRAMES

(75) Inventors: Wanshi Chen, San Diego, CA (US); Juan Montojo, San Diego, CA (US); Aleksandar Damnjanovic, Del Mar, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 13/546,772

(22) Filed: Jul. 11, 2012

(65) Prior Publication Data

US 2013/0016692 A1 Jan. 17, 2013

Related U.S. Application Data

(60) Provisional application No. 61/507,087, filed on Jul. 12, 2011.

(51) Int. Cl.
*H04W 72/04* (2009.01)
*H04L 5/00* (2006.01)

(52) U.S. Cl.
CPC ............ *H04L 5/0094* (2013.01); *H04L 5/0053* (2013.01)

(58) Field of Classification Search
None
See application file for complete search history.

(56) References Cited

U.S. PATENT DOCUMENTS 7,940,740 B2  5/2011 Krishnamurthy et al.
8,423,008 B2 * 4/2013 Pedersen et al. ............. 455/418
2010/0215011 A1 * 8/2010 Pan et al. .................... 370/329
2010/0219989 A1  9/2010 Asami et al.
2011/0064037 A1  3/2011 Wei et al.

(Continued)

FOREIGN PATENT DOCUMENTS

CN         102065490 A     5/2011
WO       2010101410 A2    9/2010

OTHER PUBLICATIONS

3rd Generation Partnership Project; Technical Specification Group Radio Access Network; Evolved universial terrestrial Radio Access (E-ultra) and evolved universal terrestrial radio access network (E-Utran); overall description; stage 2 (Release 10), 3Gpp Standard; 3GPP TS 36.300, 3rd Generation Partnership Project (3GPP), Mobile competence centre; 650, Route Deslucioles; F-06921 Sophia-Antipolis cedex; France, No. V10.3.0, Apr. 5, 2011, pp. 1-197, XP050477175.

(Continued)

*Primary Examiner* — Huy D Vu
*Assistant Examiner* — Teisha D Hall
(74) *Attorney, Agent, or Firm* — Novak Druce Connolly Bove + Quigg LLP

(57) ABSTRACT

In a wireless communications system wherein control-less subframes share a common carrier with subframes that include control signaling, a method performed by a base station may include receiving a first indication from a network entity to maintain a designated set of subframes on a common carrier devoid of designated downlink control signals. The method may further include providing a second indication in a wireless transmission to a mobile entity, the second indication enabling identification of subframes in the designated set (i.e., the control-less subframes) by the mobile entity. In turn, identification of control-less subframes by the mobile entity prior to decoding the subframes may enable a more efficient control of blind decoding operations at the mobile entity and reduce blind decoding operations required for the mobile entity to decode downlink control information.

57 Claims, 18 Drawing Sheets

(56) References Cited

U.S. PATENT DOCUMENTS

| | | |
|---|---|---|
| 2011/0075611 A1 | 3/2011 | Choi |
| 2011/0105050 A1* | 5/2011 | Khandekar et al. ............. 455/68 |
| 2011/0128896 A1 | 6/2011 | Huang et al. |
| 2011/0164549 A1 | 7/2011 | Huang et al. |
| 2011/0170496 A1 | 7/2011 | Fong et al. |
| 2011/0176500 A1 | 7/2011 | Wager et al. |
| 2011/0223927 A1 | 9/2011 | Seo et al. |
| 2011/0235584 A1 | 9/2011 | Chen et al. |
| 2011/0310830 A1* | 12/2011 | Wu et al. ........................ 370/329 |
| 2012/0039179 A1* | 2/2012 | Seo et al. ....................... 370/241 |

OTHER PUBLICATIONS

Ericsson et al: "Details of almost blank subframes", 3GPP Draft; R1-105335, 3rd Generation Partnership Project (3GPP), Mobile competence centre; 650, Route Deslucioles; F-06921 Sophia-Antipolis cedex; France, vol. Ran WG1, No. Xi' an; 20101011, Oct. 14, 2010, XP050462815.

International Search Report—PCT/US2012/046476—ISA/EPO—Oct. 11, 2012.

Vinella, et al., "Discontinuous Reception and Transmission (DRX/DTX) Strategies in Long Term Evolution (LTE) for Voice-Over-IP (VOIP) Traffic Under Both Full-Dynamic and Semi-Persistent Packet Scheduling Policies," Nov. 20, 2009, pp. 1-123.

CMCC: "Summary of the description of candidate eICIC solutions", 3GPP TSG-RAN WG1 Meeting #62, R1-105081, Aug. 27, 2010, 6 Pages.

Qualcomm Incorporated: "Remaining details of R-PDCCH search space", 3GPP TSG-RAN WG1 Meeting #63, R1-106377, Nov. 9, 2010, pp. 1-2.

Qualcomm Incorporated: "eICIC ABS Pattern Considerations", 3GPP TSG-RAN WG4 Meeting #57, R4-104151, Nov. 10, 2010, 6 Pages.

Taiwan Search Report—TW101125192—TIPO—Jul. 31, 2014.

* cited by examiner

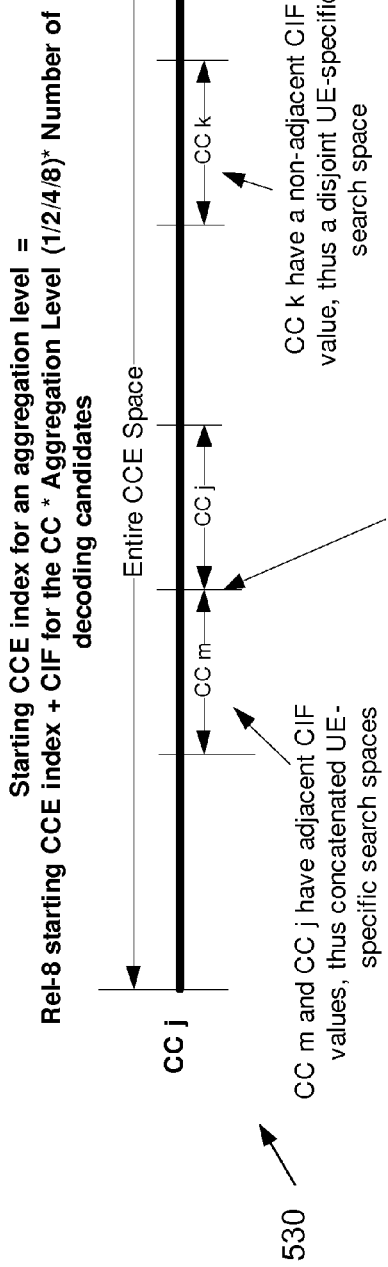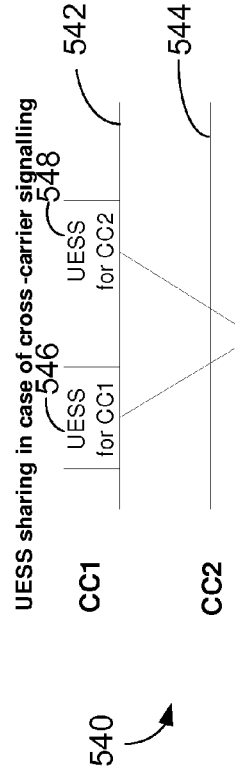
FIG. 5B
FIG. 5C

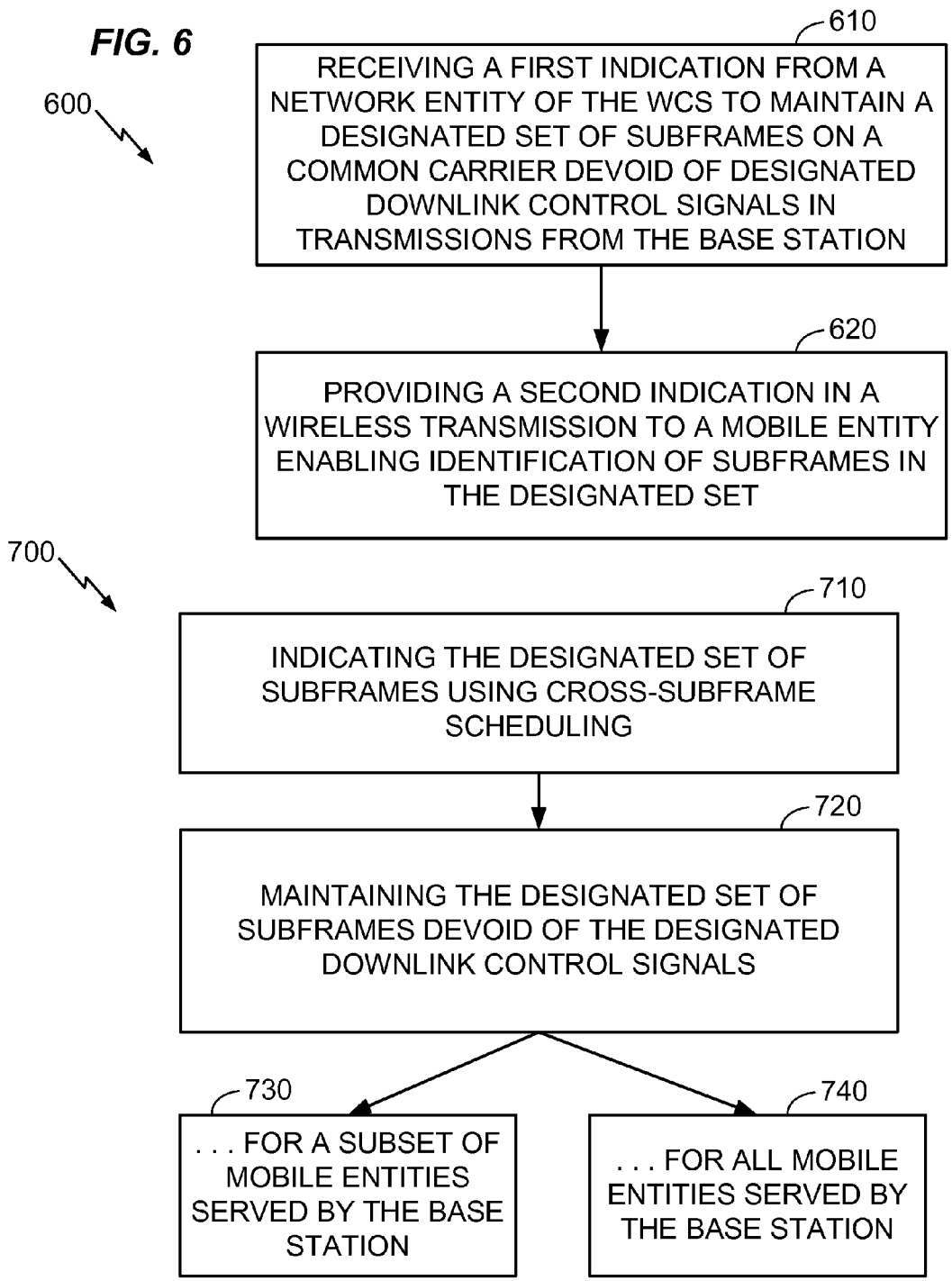

810
RECEIVING A PHYSICAL UPLINK SHARED CHANNEL (PUSCH) TRANSMISSION IN AN UPLINK SUBFRAME ASSOCIATED WITH THE DESIGNATED SET OF SUBFRAMES BASED ON AN UPLINK HYBRID AUTOMATIC REPEAT REQUEST (H-ARQ) TIMING RELATIONSHIP

820
RECEIVING AN ADAPTIVE PUSCH TRANSMISSION SCHEDULED BY A CONTROL SIGNAL USING A NEW CONTROL REGION IN ONE OF THE DESIGNATED SET OF SUBFRAMES BASED ON THE UPLINK H-ARQ TIMING RELATIONSHIP

830
RECEIVING A SEMI-PERSISTENT SCHEDULING (SPS) TRANSMISSION IN THE UPLINK SUBFRAME

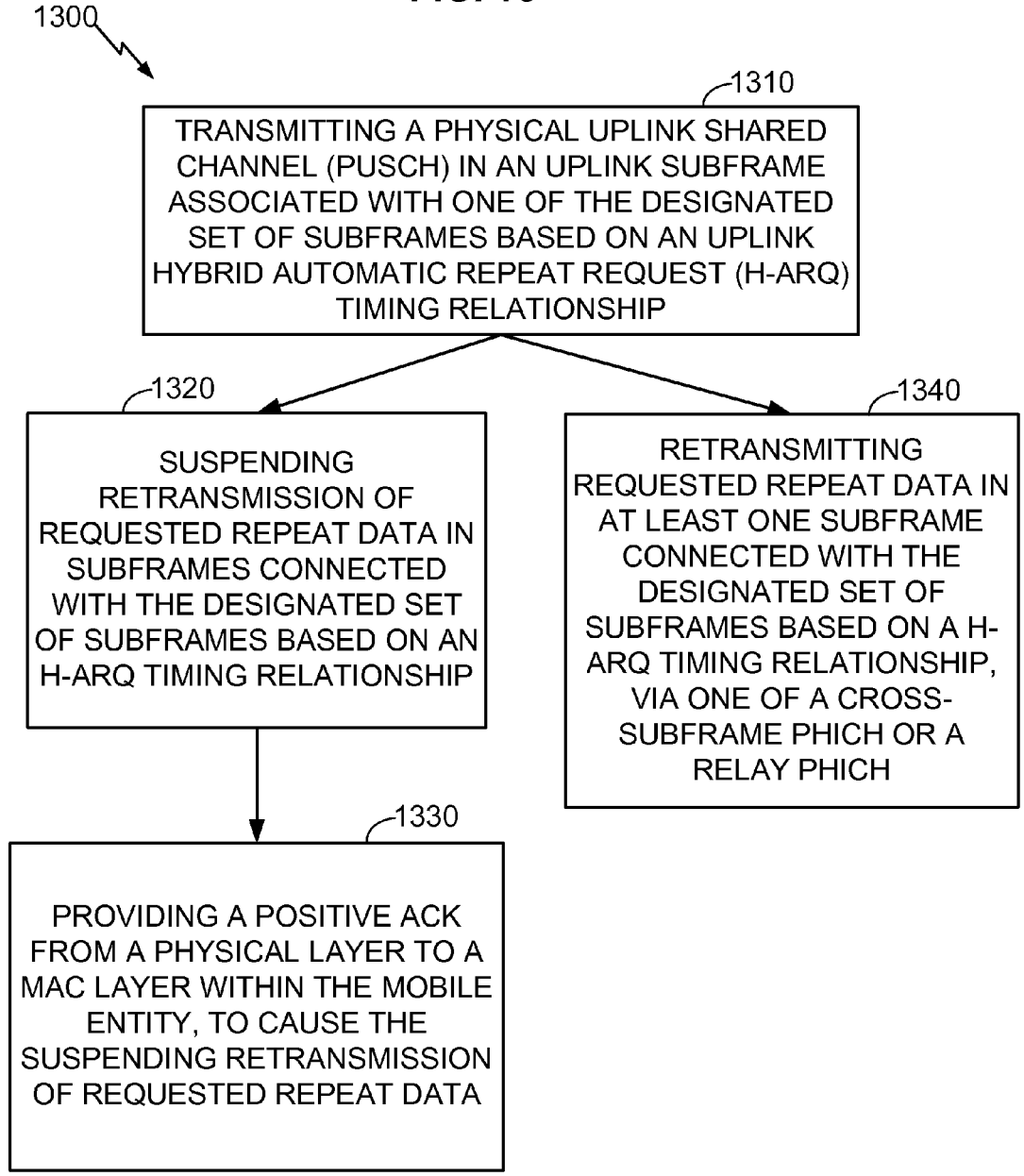

1410 — TRANSMITTING AN ADAPTIVE PUSCH TRANSMISSION SCHEDULED BY A CONTROL SIGNAL USING A NEW CONTROL REGION IN AN UPLINK SUBFRAME ASSOCIATED WITH THE DESIGNATED SET OF SUBFRAMES BASED ON THE UPLINK H-ARQ TIMING RELATIONSHIP

1420 — TRANSMITTING A SEMI-PERSISTENT SCHEDULING (SPS) TRANSMISSION IN THE UPLINK SUBFRAME

1460 — RECEIVING DOWNLINK CONTROL SIGNALS IN A NEW CONTROL REGION IN AT LEAST ONE SUBFRAME ASSOCIATED WITH THE DESIGNATED SET OF SUBFRAMES

1470 — RECEIVING A PHYSICAL DOWNLINK SHARED CHANNEL (PDSCH) IN THE AT LEAST ONE SUBFRAME ASSOCIATED WITH THE DESIGNATED SUBFRAMES

1510: RECEIVING PDCCH SIGNALS USING A LEGACY CONTROL REGION ONLY IN SUBFRAMES OTHER THAN THE DESIGNATED SET OF SUBFRAMES

1520: PERFORMING A NUMBER OF BLIND DECODING OPERATIONS ACCORDING TO A SCHEDULING ARRANGEMENT OF THE PDCCH SIGNALS

1530: PERFORMING A FIXED NUMBER OF BLIND DECODING OPERATIONS FOR PDCCH IRRESPECTIVE OF HOW MANY DESIGNATED SETS OF SUBFRAMES ARE DEVOID OF PDCCH SIGNALS

1540: RECEIVING THE PDCCH SIGNALS IN A FIRST SUBFRAME THAT INCLUDES INFORMATION SCHEDULING DOWNLINK DATA TRANSMISSIONS FOR A PLURALITY OF SUBFRAMES TO THE MOBILE ENTITY

1550: ACCESSING A PLURALITY OF SEARCH SPACES SPECIFIC TO THE MOBILE ENTITY IN THE FIRST SUBFRAME, WHEREIN EACH SEARCH SPACE IS BASED AT LEAST IN PART ON THE SUBFRAME INDEX OF THE CORRESPONDING DOWNLINK DATA TRANSMISSION

DOWNLINK CONTROL WITH CONTROL-LESS SUBFRAMES

CROSS REFERENCE TO RELATED APPLICATION

This application claims priority pursuant to 35 U.S.C. §119(e) to U.S. provisional application Ser. No. 61/507,087 filed Jul. 12, 2011, which application is hereby incorporated by reference, in its entirety.

FIELD

Aspects of the present disclosure relate generally to wireless communication systems, and more particularly, to downlink control in wireless communication systems using subframes devoid of downlink control signals, sometimes referred to herein as "control-less subframes."

BACKGROUND

Wireless communication networks are widely deployed to provide various communication services such as voice, video, packet data, messaging, broadcast, or other services. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, sometimes referred to as user equipments (UEs). A UE may communicate with a base station via the downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling. In broadcast operation, several eNBs in a broadcast area broadcast signals in a synchronized fashion, carrying information that can be received and accessed by any subscriber UE, or in the case of multicast broadcast by a specific group of UEs, in the broadcast area. The generality of broadcast operation enables greater efficiency in transmitting information of general public interest, for example, event-related multimedia broadcasts.

As demand and consumption of wireless services has increased, wireless communications systems have evolved to include multiple-carrier implementations. In this context, a carrier may be a radio band centered on a particular frequency, used to wirelessly transmit data. In multiple-carrier implementations, base stations and mobile entities communicate with one another using more than one carrier. Multiple-carrier implementations may be used in various contexts, for example in carrier aggregation and heterogeneous networks ("HetNet").

SUMMARY

Control-less subframes may be used in various wireless communications contexts including multiple-carrier implementations. For example, a control-less subframe may include an Almost Blank Subframe (ABS) as proposed for LTE-Advanced (LTE-A) including LTE Release 10 and above, in non-carrier aggregation based heterogeneous networks. An ABS subframe is reserved almost entirely for data, with limited exceptions primarily for support of legacy equipment. Advantageously, use of ABS subframes may free up resource elements for other purposes, for example for transmitting downlink data. An ABS subframe, and any similar control-less subframe, may be devoid of any downlink control signals, or devoid of certain types of downlink control signals. In control-less subframe contexts, a method for managing downlink control signals from a base station of a wireless communications system (WCS) may include operations as described below. The WCS may use a frequency and time denoted resource grid divided into subframes, such are characteristically used in multiple-access networks as exemplified above and in more detail in the detailed description that follows. Control-less subframes may be used in multi-carrier contexts, wherein control signals are allocated to a designated one of multiple carriers, and subframes in a carrier that is not designated for control signals therefore lack such signals. However, the present application is directed to implementations wherein the control-less subframes share a common carrier with subframes that include control signaling, unlike implementations wherein control signaling is reserved for a designated carrier.

The method may include receiving a first indication from a network entity of the WCS to maintain a designated set of subframes on a common carrier devoid of designated downlink control signals in transmissions from a base station. The method may further include providing a second indication in a wireless transmission to a mobile entity, the second indication enabling identification of subframes in the designated set (i.e., the control-less subframes) by the mobile entity. In turn, identification of control-less subframes by the mobile entity prior to decoding the subframes may enable various advantages over prior communications technology, for example as described in the detailed description that follows. The advantages may include, for example, enabling control of blind decoding operations at the mobile entity in conjunction with use of control-less subframes, so as to reduce blind decoding operation required for the mobile entity to decode necessary downlink control information. Reducing blind decoding operations as enabled by the methods herein may, in turn, substantially reduce processing overhead at the mobile entity without increasing processing overhead at the base station or other network entity and without any detriment to control signaling.

In an aspect, embodiments of the method may include maintaining the designated set of subframes devoid of the designated downlink control signals for a subset of mobile entities served by the base station. For example, the subset may be as small as a single mobile entity selected out of a group of multiple mobile entities, or may comprise a smaller group of mobile entities selected out of a larger group. In the alternative, the method may include maintaining the designated set of subframes devoid of the designated downlink control signals for all mobile entities served by the base station. In another aspect of the method, providing the second indication enabling identification of the control-less subframes may include indicating the designated set of subframes using cross-subframe scheduling.

In another aspect, the method may include maintaining the designated set of subframes devoid of the designated downlink control signals, wherein the designated downlink control signals are from a legacy control region. The method may further include scheduling downlink control signals from a new control region in at least one subframe associated with the designated set of subframes for at least a subset of mobile entities served by the base station. In addition, the method may include transmitting a physical downlink shared channel (PDSCH) in the at least one subframe associated with the designated set of subframes for at least a subset of mobile entities served by the base station.

In another aspect, the method may include receiving a physical uplink shared channel (PUSCH) transmission in an uplink subframe associated with the designated set of subframes based on an uplink hybrid automatic repeat request (H-ARQ) timing relationship. In another aspect, the method may include receiving an adaptive PUSCH transmission scheduled by a control signal using a new control region in one of the designated set of subframes based on the uplink H-ARQ timing relationship. The method may include receiving a semi-persistent scheduling (SPS) transmission in the uplink subframe.

In other aspects, the method may include suspending a PUSCH transmission in an uplink subframe associated with one of the designated set of subframes based on an uplink H-ARQ timing relationship. The method may include scheduling physical downlink control channel (PDCCH) signals using a legacy control region only in subframes other than the designated set of subframes to a mobile entity. In an aspect, scheduling the PDCCH signals may further include maintaining a constant number of blind decoding operations for PDCCH signals irrespective of how many of designated set of subframes are devoid of PDCCH signals. The method may further include scheduling the PDCCH signals in a first subframe that includes information scheduling downlink data transmissions for a plurality of subframes to the mobile entity. The method may include allocating a plurality of search spaces specific to the mobile entity in the first subframe, wherein each search space is based at least in part on the subframe index of the corresponding downlink data transmission.

In another aspect, a method may be provided for using downlink control signals on a common carrier at a mobile entity of a WCS using a frequency and time denoted resource grid as provided by a base station. The base station may provide the signals according to a method as outlined above. The method for performing at a mobile entity may include receiving an indication in a wireless signal from a base station of the WCS. The indication may be received in various different ways as detailed below. The method may further include identifying a designated set of subframes on a common carrier that are devoid of designated downlink control signals (e.g., an indication identifying control-less subframes), using the indication. In turn, identification of the designated control-less subframes may enable more efficient processing of data and control signals received using such subframes.

In an aspect, the method may include receiving the indication by receiving cross-subframe scheduling indicative of the designated set of subframes. The method may further include receiving downlink control signals in a new control region in at least one subframe associated with the designated set of subframes. The method may further include receiving a physical downlink shared channel (PDSCH) in the at least one subframe associated with the designated subframes. In another aspect, the method may further include transmitting a physical uplink shared channel (PUSCH) in an uplink subframe associated with one of the designated set of subframes based on an uplink hybrid automatic repeat request (H-ARQ) timing relationship. The method may further include suspending retransmission of requested repeat data in subframes connected with the designated set of subframes based on an H-ARQ timing relationship. In such case, the method may include providing a positive acknowledgement (ACK) from a physical layer to a media access control (MAC) layer within the mobile entity to cause the suspending retransmission of requested repeat data. In the alternative, the method may include retransmitting requested repeat data in at least one subframe connected with the designated set of subframes based on an H-ARQ timing relationship, via one of a cross-subframe physical hybrid ARQ indicator channel (PHICH) or a relay PHICH (R-PHICH).

In another aspect, the method for performance by a mobile entity may include transmitting an adaptive PUSCH transmission scheduled by a control signal using a new control region in an uplink subframe associated with the designated set of subframes based on the uplink H-ARQ timing relationship. The method may include transmitting a semi-persistent scheduling (SPS) transmission in the uplink subframe.

In another aspect, the method may include receiving PDCCH signals only using a legacy control region in subframes other than the designated set of subframes, and performing a number of blind decoding operations according to a scheduling arrangement of the PDCCH signals. In such case, the method may include performing a fixed number of blind decoding operations for PDCCH signals irrespective of how many designated sets of subframes are devoid of PDCCH signals. The method may include receiving the PDCCH signals in a first subframe that includes information scheduling downlink data transmissions for a plurality of subframes to the mobile entity. In addition, the method may include accessing a plurality of search spaces specific to the mobile entity in the first subframe, wherein each search space is based at least in part on the subframe index of the corresponding downlink data transmission.

In related aspects, a communications apparatus may be provided for performing any of the methods and related aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as base stations and mobile entities of various types used for wireless communications. Similarly, an article of manufacture may be provided, including a non-transient computer-readable storage medium holding encoded instructions, which when executed by a processor, cause a communications apparatus to perform the methods and aspects of the methods as summarized above.

BRIEF DESCRIPTION OF THE DRAWINGS

FIGS. 5B-5D are diagrams illustrating aspects of cross-carrier signaling.

FIGS. 6-9B are flow diagrams illustrating embodiments of a methodology for managing downlink control signals from a base station of a wireless communications system.

FIGS. 11-15 are flow diagrams illustrating embodiments of a methodology for using downlink control signals on a common carrier at a mobile entity of a wireless communications system.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as, for example, Universal Terrestrial Radio Access (UTRA) or CDMA 2000. UTRA includes Wideband CDMA (WCDMA) and other variants of CDMA. CDMA 2000 may be described by IS-2000, IS-95 and IS-856 standards. A TDMA network may implement a radio technology such as, for example, Global System for Mobile Communications (GSM). An OFDMA network may implement a radio technology such as, for example, Evolved UTRA (E-UTRA), Ultra Mobile Broadband (UMB), IEEE 802.11 (Wi-Fi), IEEE 802.16 (WiMAX), IEEE 802.20, and Flash-OFDMA. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA 2000 and UMB are described in documents from an organization named "3rd Generation Partnership Project 2". The techniques described herein may be used for the wireless networks and radio technologies mentioned above as well as other wireless networks and radio technologies. By way of example only, certain aspects of the techniques are described below for LTE, and LTE terminology is used in much of the description below.

Figure 1:
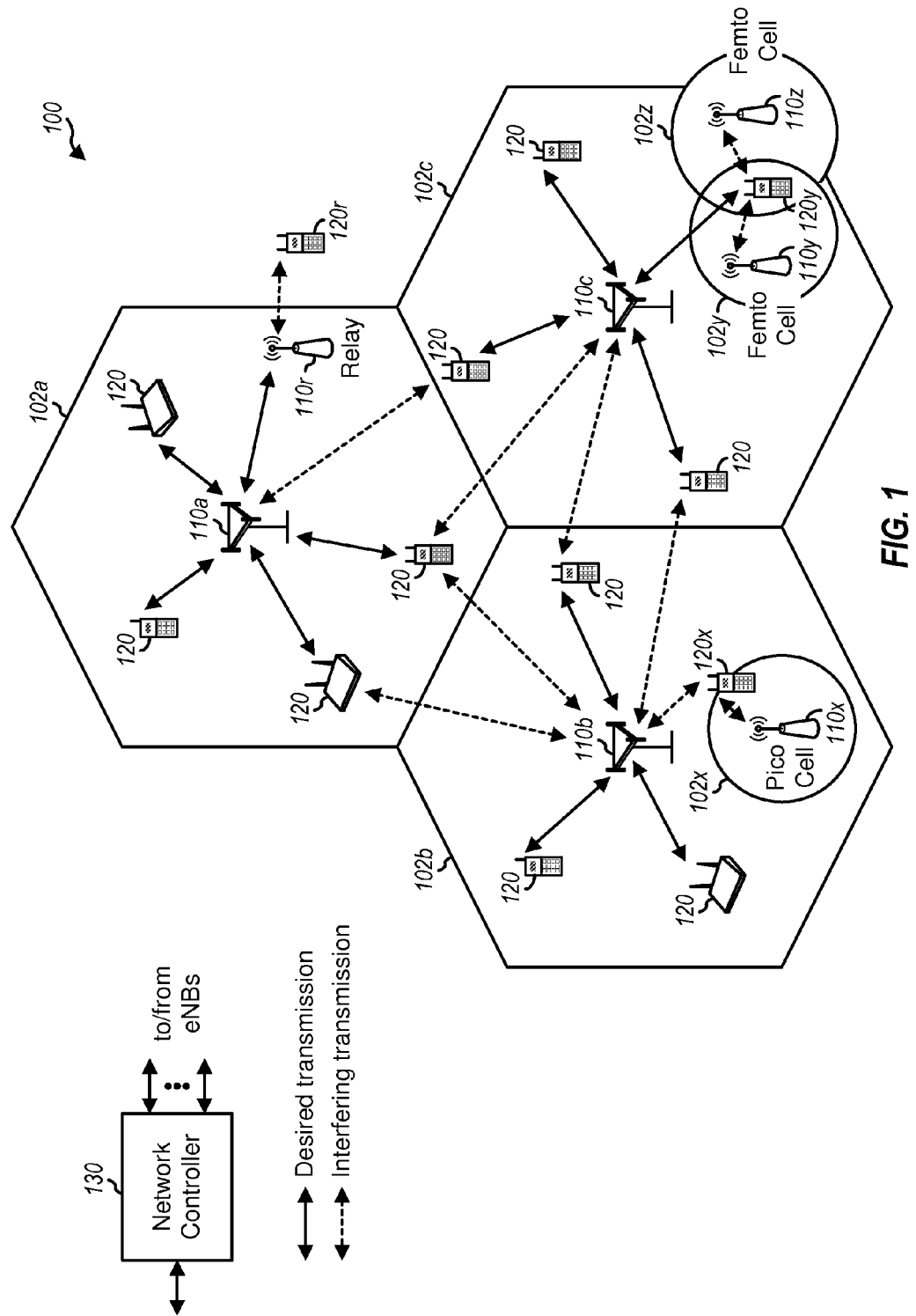
FIG. 1 is a schematic diagram conceptually illustrating an example of a wireless telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one cell using a single carrier, or multiple cells using corresponding multiple carriers.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 5 to 40 Watts) whereas pico eNBs, femto eNBs and relays may have a lower transmit power level (e.g., 0.1 to 2 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a mobile entity, a subscriber unit, a station, or other terminology. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
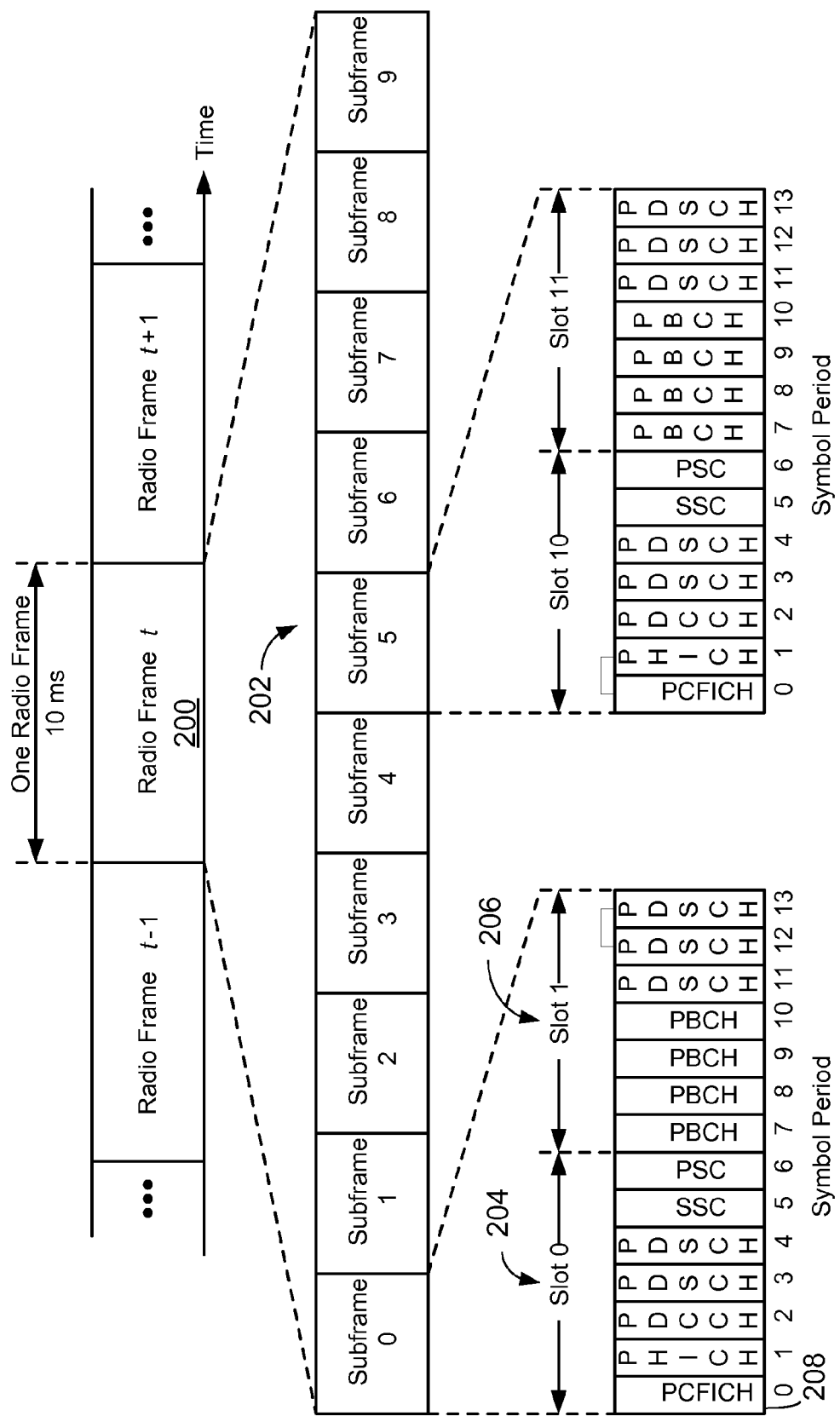
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame (e.g., frame "t" 200) may have a predetermined duration (e.g., 10 milliseconds (ms)) and may be partitioned into 10 subframes 202 with indices of 0 through 9. Each subframe may include two slots 204, 206. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period 208 in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period 208. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 (208) or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as, for example, received power, path loss, signal-to-noise ratio (SNR), or other criterion.

Figure 3:
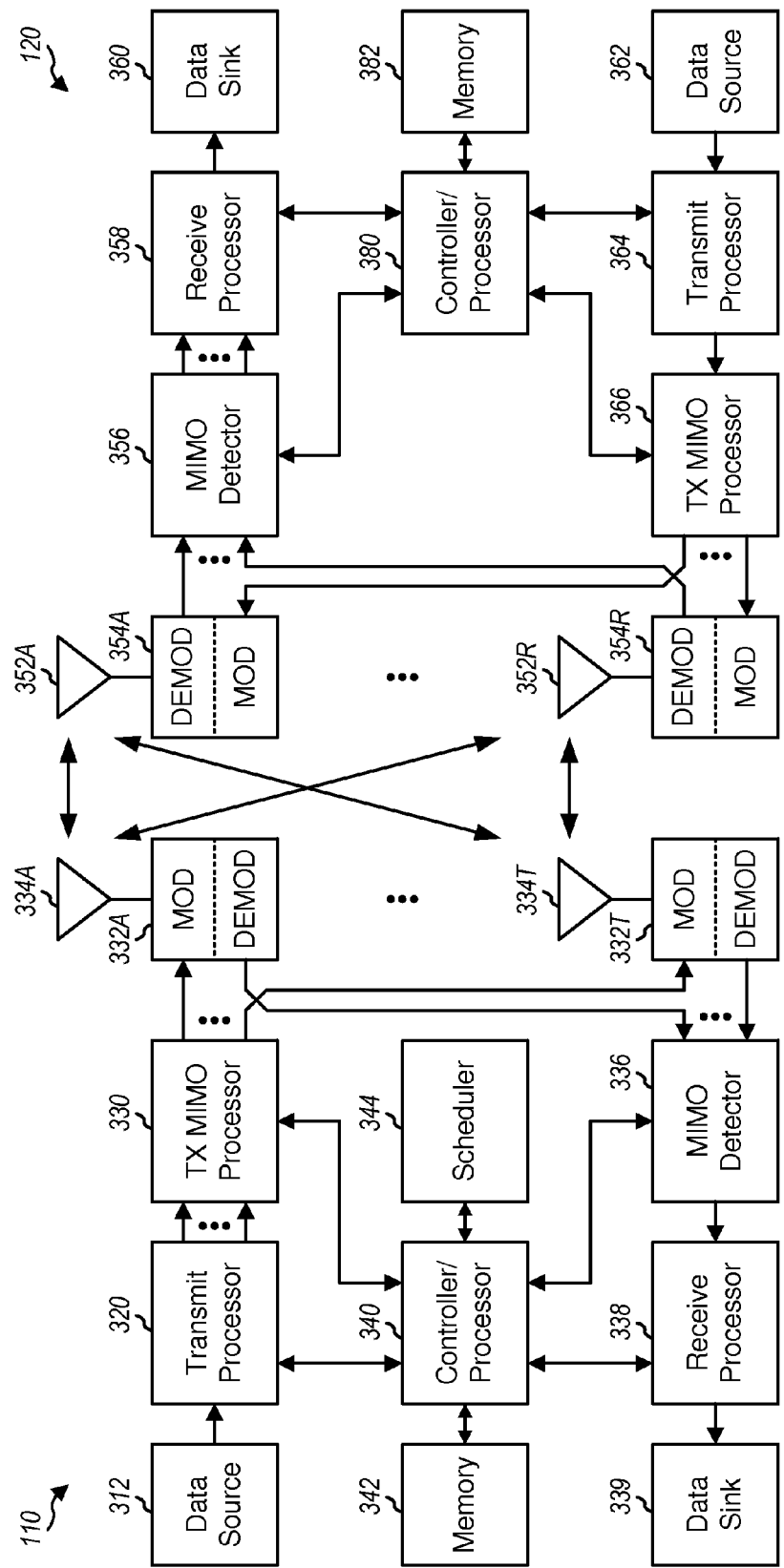
FIG. 3 is a block diagram conceptually illustrating is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type.

The base station 110 may be equipped with antennas 334A through 334T, and the UE 120 may be equipped with antennas 352A through 352R.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332A through 332T. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332A through 332T may be transmitted via the antennas 334A through 334T, respectively.

At the UE 120, the antennas 352A through 352R may receive the downlink signals from the base station 110 and may provide received signals to the demodulators (DEMODs) 354A through 354R, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354A through 354R, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354A through 354R (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In an aspect, the base station 110 for wireless communication includes means for receiving a first indication from a network entity of the WCS to maintain a designated set of subframes on a common carrier devoid of designated downlink control signals in transmissions from the base station, coupled to means for providing a second indication in a wireless transmission to a mobile entity enabling identification of subframes in the designated set by the mobile entity, prior to decoding the subframes. The second indication may be provided by explicit or implicit signaling. The indication may be configured so as to be useful to a UE, for example, for controlling a number of blind decoding operations used to decode designated downlink control signals. In one aspect, the aforementioned means may include the processor(s), the controller/processor 340, the memory 342, the transmit processor 320, the TX MIMO processor 3330, the modulators 332A, and the antennas 334A configured to perform the functions recited by the aforementioned means. In another aspect, the aforementioned means may be a module or any apparatus configured to perform the functions recited by the aforementioned means.

In another aspect, the UE 120 for wireless communication includes means for receiving an indication from a base station identifying a set of subframes that are devoid of designated downlink control signals, coupled to means for identifying the set of subframes and using the identification to process control information in the set of subframes, for example, controlling a number of blind decoding operations using the identification information. In one aspect, the aforementioned means may include the processor(s), the controller/processor 380, the memory 382, the receive processor 358, the MIMO detector 356, the demodulators 354A, and the antennas 352A configured to perform the functions recited by the aforementioned means. In another aspect, the aforementioned means may be a module or any apparatus configured to perform the functions recited by the aforementioned means.

Carrier Aggregation in LTE-A

LTE-Advanced UEs can use spectrum in 20 Mhz bandwidths allocated to component carriers used in carrier aggregation, for up to a total of 100 Mhz (using 5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Figure 4A:
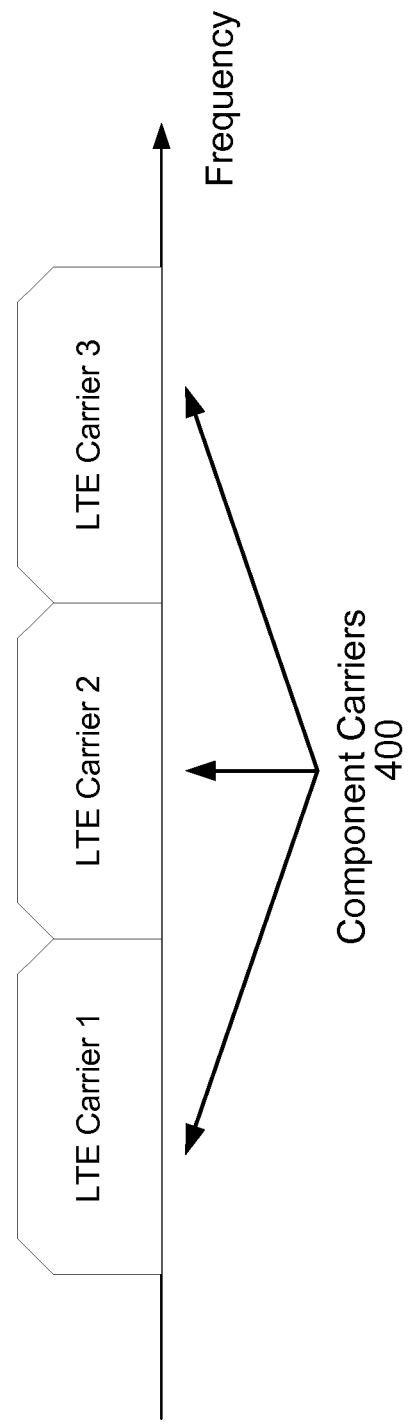
FIG. 4A is a block diagram illustrating an example of a continuous carrier aggregation type.
Figure 4B:
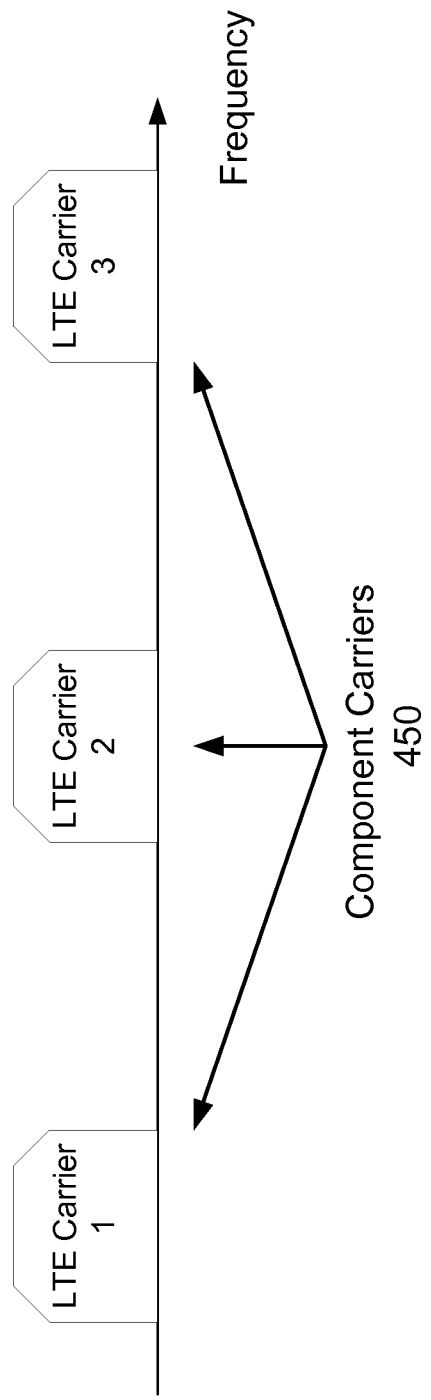
FIG. 4B is a block diagram illustrating an example of a non-continuous carrier aggregation type.

For the LTE-Advanced mobile systems, two types of carrier aggregation (CA) have been proposed, continuous CA and non-continuous CA. They are illustrated in FIGS. 4A and 4B. Non-continuous CA occurs when multiple available component carriers 450 are separated along the frequency band, as illustrated by FIG. 4B. On the other hand, continuous CA occurs when multiple available component carriers 400 are adjacent to each other, as illustrated by FIG. 4A. Both non-continuous CA and continuous CA may be used to aggregate multiple LTE/component carriers to serve a single unit of LTE Advanced UE. As noted above, the present application is directed to implementations wherein the control-less subframes share a common carrier with subframes that include control signaling, unlike implementations wherein control signaling is reserved for a designated carrier. Thus, the present technology may be adopted in single-carrier or in multiple-carrier contexts, in either case enabling control-less subframes on the same carrier or carriers that also carry subframes with control signaling.

Multiple radio frequency receiving units and multiple fast Fourier transforms (FFTs) may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary considerably at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

Non-CA HetNet in LTE-A

In Heterogenous Networks (HetNet) configurations, LTE-A may accommodate heterogeneous nodes with, or without, carrier aggregation. A heterogeneous network may include heterogeneous base stations and other nodes, characterized by differences in transmission power and RF coverage area. For example, a HetNet may include co-existing low power nodes and high power nodes operating on the same network. Different types of base stations may share radio resources and use a resource management scheme to manage interference issues, without carrier aggregation. In the alternative, or in addition, the low power and high power nodes may use discontinuous bands (e.g., carriers or sub-carriers) of an operator separately, as in carrier aggregation. Macro nodes, sometimes referred to as macro cells, may be deployed in a planned way for large-scale coverage of an area, while smaller nodes may be used to complement the macro base stations for coverage extension or throughput enhancement. Low power nodes may include, for example, pico network nodes (pico cells), home-evolved Node-Bs (HeNBs)/closed subscriber group (CSG) cells, femto nodes and relay nodes.

Data Aggregation Schemes

Figure 5A:
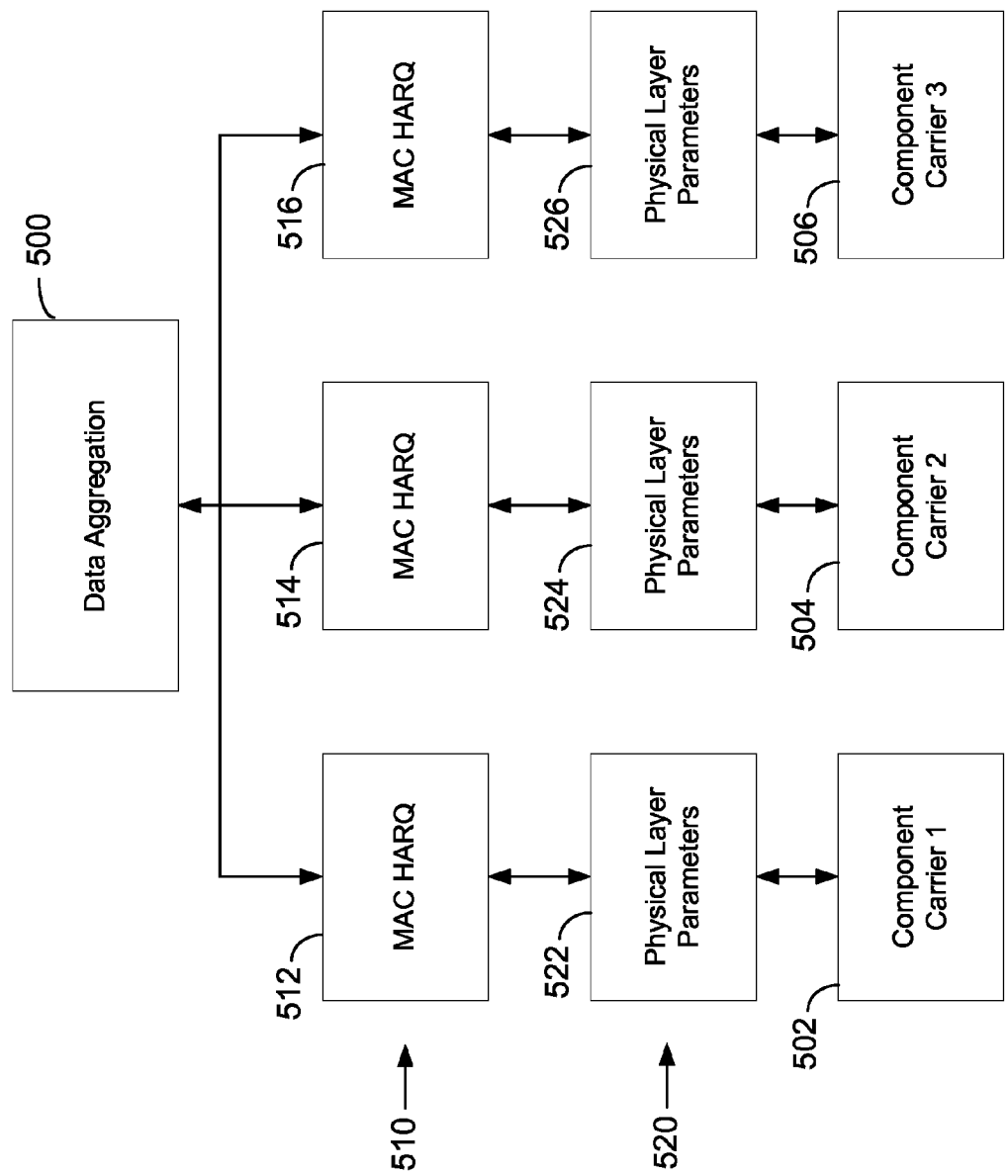
FIG. 5A is a block diagram illustrating an example of MAC layer data aggregation.

FIG. 5 illustrates aggregating transmission blocks (TBs) from different component carriers 502, 504, 506 at the medium access control (MAC) layer 510 for an International Mobile Telecommunications Advanced (IMT-Advanced) system. With MAC layer data aggregation, each component carrier has its own independent hybrid automatic repeat request (H-ARQ) entity 512, 514, 516 in the MAC layer and its own transmission configuration parameters 522, 524, 526 (e.g., transmitting power, modulation and coding schemes, and multiple antenna configuration) in the physical layer 520. Similarly, in the physical layer 520, one H-ARQ entity may be provided for each component carrier 502, 504, 506. Data 500 may thereby be transmitted across multiple component carriers and aggregated by a receiver, or conversely disaggregated by a transmitter and transmitted across the multiple carriers. Although three component carriers are illustrated, similar aggregation may be performed using any plural number of component carriers.

H-ARQ may use a stop and wait protocol wherein the transmitter stops and waits until it receives an acknowledgment (ACK) or negative acknowledgement (NACK) from the receiver before transmitting the next block of data or retransmitting the first data block in case of non-recoverable errors. Whether receiving an ACK or NACK, the transmitter schedules the next transmission within a specific time period. For example, in uplink FDD for LTE, the period is eight 1-ms subframes. To more fully utilize bandwidth, LTE specifies use of parallel HARQ processes offset in time from each other for respective transmission blocks. H-ARQ timing may have a periodicity different from control-less subframes. Differing periodicities between H-ARQ signaling and control-less subframes may be handled as discussed in more detail below.

Control Signaling

In general, three different approaches may be used for deploying control channel signaling for multiple component carriers. The first approach may use a minor modification of the control structure in LTE systems whereby each component carrier is given its own coded control channel. This approach may increase control signaling overhead required for aggregated data.

The second approach may involve jointly coding the control channels of different component carriers and deploying the control channels in a dedicated component carrier. The control information for the multiple component carriers may be integrated as the signaling content in this dedicated control channel. As a result, backward compatibility with the control channel structure in LTE systems may be maintained, while signaling overhead for CA is reduced. Control-less subframes in the component carriers that are not used for the dedicated control channel may be used to transmit non-control data.

In a third approach, multiple control channels for different component carriers may be jointly coded and then transmitted over the entire frequency band. This approach offers low signaling overhead and high decoding performance in control channels, at the expense of high power consumption at the UE side. However, this method may not be compatible with LTE systems.

eMBMS and Unicast Signaling in Single Frequency Networks

One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) including, for example, what has recently come to be known as multimedia broadcast single frequency network (MBSFN) in the LTE context, can utilize such SFN operation. SFNs utilize radio transmitters, such as, for example, eNBs, to communicate with subscriber UEs. Groups of eNBs can transmit bi-directional information in a synchronized manner, so that signals reinforce one another rather than interfere with each other. In the context of eMBMS, there remains a need for single carrier optimization for transmitting shared content from a LTE network to multiple UEs.

Almost Blank Subframes (ABS)

As defined by Release 10 of 3GPP, an Almost Blank Subframe (ABS) excludes certain control signals and unnecessary data, and represents a species of control-less subframe. Each ABS includes Common Reference Signals (CRS). Certain other control signals may be included for legacy support when coinciding with an ABS. Such signals may include synchronization signals, paging signals, System Information Block (SIB) 1 signals, and positioning reference signals. Paging and SIB 1 signals, when included in an ABS, may be associated with the Primary Downlink Control Channel (PDCCH). Legacy mobile entities may not be able to detect ABS subframes, and ABS is not used for transmitting MBSFN data.

For non-CA based heterogeneous networks, a bitmap pattern sent over X2 interface backhaul signaling may be used to indicate an ABS pattern transmitted by a macro node to a pico cell. An ABS pattern is semi-statically updated, and may not be changed more frequently than allowed for certain legacy X2 signals such as, for example, relative narrowband transmit power signals. Additional X2 signaling may indicate a subset of ABS subframes recommended to the receiving node for configuration of restricted radio link monitoring and radio resource monitoring measurements.

Search Space Design, Non-CA

In single carrier (non-carrier aggregation) contexts, legacy mobile entities may be required to monitor two sets of PDCCH decoding candidates: a Common Search Space (CSS) and a UE-Specific Search Space (UESS). A decoding candidate may be an encoded discrete data element intended for one or more particular mobile entities, or for all mobile entities receiving the data element. Each mobile entity receiving the encoded data element may determine whether or not the candidate is intended for the receiving entity by attempting to decode the encoded element. If the decoding attempt by the mobile entity is successful, the mobile entity obtains a recognizable control signal and can infer that it is an intended recipient of the control signal. If the decoding attempt is not successful, the mobile entity does not obtain a recognizable control signal from the decoding process, and can infer that it is not an intended recipient. Because the mobile entity attempts to decode the candidate element without first determining whether or not it is an intended recipient, the decoding process at the receiving entity may be referred to as "blind decoding."

In a CSS, the UE monitors up to six decoding candidates, made up of four decoding candidates for aggregation level 4 and 2 decoding candidates for aggregation level 8. An aggregation level number "N" (e.g., 4, 8) is defined by having N control channel elements, each having 36 resource elements being of one frequency-time grid. The CSS may be common to all UEs. It may be primarily used for broadcast messages such as system, paging and RACH response, but may also be used for unicast scheduling. Each decoding candidate may be in one of two distinct format sizes and therefore may require up to two separate decoding attempts by the mobile entity. Accordingly, a total of up to 12 (6×2) blind decoding operations may be required at the mobile entity for decoding candidates in a CSS.

The UESS may include a set of decoding candidates that varies in number as a function of the UE identifier (ID), and other parameters such as the subframe index. There may be up to 16 decoding candidates, with 6 candidates for aggregation level 1, 6 candidates for level 2, 2 for level 4 and 2 for level 8. The downlink and uplink grants may share the same set of decoding candidates. Each decoding candidate may be in one of two possible sizes for legacy mobile entities, or one of three possible sizes for Release 10 compliant UEs. Therefore, the legacy UE may be required to perform up to 32 (16×2) blind decodes, while the Release 10 UE may be required to perform up to 48 (16×3) blind decodes, for decoding candidates in a UESS.

Search Space Design in CA

In CA networks, a CSS may be carried only on the Primary Control Channel (PCC). System information of other control channels can be conveyed by signaling on the same carrier as the subframes to which the control channels relate. The UESS may be the same as in the non-CA network, where cross-carrier signaling is not used. Cross-carrier signaling, however, may be advantageous to reduce overall control overhead.

When cross-carrier signaling is used, a PDCCH control channel may require two or more distinct UESSs: a first UESS for higher layer PDCCH for scheduling of uplink and downlink, and one or more additional UESSs for each carrier. Each UESS may be derived similarly to a 3GPP Release 8 UESS, and may further be a function of a 3-bit cross-carrier indicator field. These UESSs may or may not overlap. FIG. 5B illustrates aspects of UESSs in contexts using cross-carrier scheduling. For a specific aggregation level (e.g., 1, 2, 4 or 8), the maximum number of blind decode operations that a UE may be required to do increases linearly with the number of carriers. The total number of blind decoding operations may be as high as 252, made up of three UESSs (48×3) plus 12 CSS decoding operations, when there are five component carriers configured for the UE. For a Control Channel Element (CCE) space 530 having "j" number of Control Channels ($CC_j$), adjacent control channels $CC_m$ and $CC_j$ may have adjacent Carrier Indication Field (CIF) values, and thus may have concatenated UESSs. In 3GPP Release 10, a CIF may be a configurable 3-bit field, and a starting index value for a CCE may differ from Release 8 depending on the CIF value. Another control channel CCk may have a non-adjacent CIF value, and thus have a disjoint UESS.

Additional scheduling flexibility may be achieved by sharing UESSs between carriers using cross-carrier signaling, in the case where the set of two or more UESSs use the same format size for Downlink Control Information (DCI), without increasing the total number of blind decoding operations. FIG. 5C illustrates sharing of UESSs on a PDCCH CC. If a set of two or more control channels (CCs) 540 scheduled on the same PDCCH have the same DCI format size, the PDCCH of that size for any given CC in the set can come from any UESS for any CC in the set, including the given CC itself. This may enable additional scheduling flexibility, without increasing the number of blind decoding operations required. For example, a first CC 542 (CC1) and a second CC 544 (CC2) may use the same DCI format size for two different DCI formats, for example for a DCI format "X" in the first control channel 542 and for a different DCI format "Y" in the second control channel 544. The X format DCI may be transmitted using a UESS 546 for the first control channel or a UESS 548 for the second control channel. Likewise, the Y format DCI may be transmitted using the UESS 546 for the first control channel or the UESS 548 for the second control channel.

Cross-Subframe Scheduling

Figure 5D:
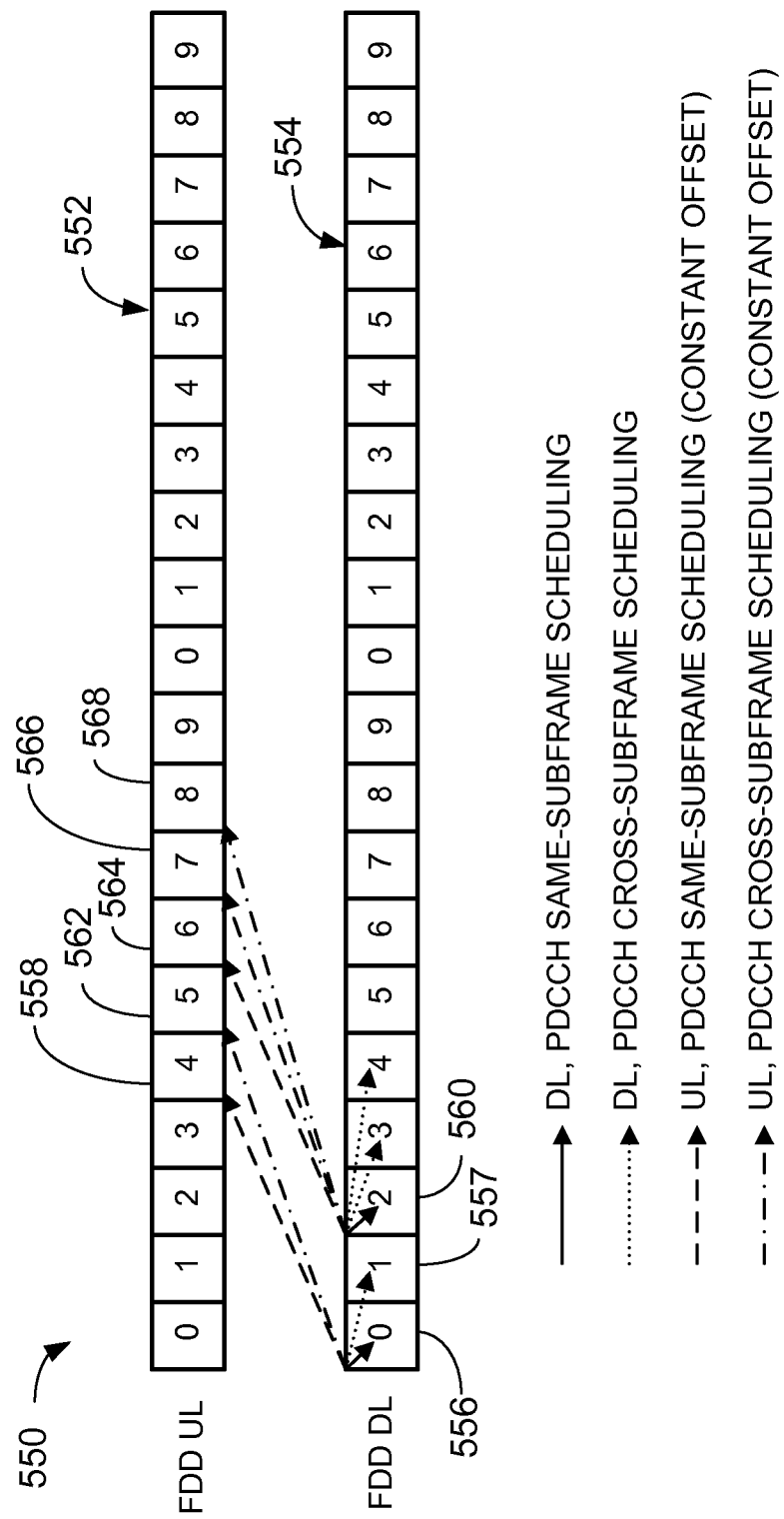

In both CA and non-CA HetNet, scheduling may be performed across subframes, as illustrated in FIG. 5D showing correlated sets 550 of Frequency Division Duplex (FDD) uplink subframes 552 and FDD downlink subframes 554. Traditionally, for example, a downlink subframe 0 556 schedules itself and uplink subframe 4 558. This is considered to be same-subframe scheduling. In addition, the subframe 0 556 may schedule downlink subframe 1 557 and uplink subframe 5 562, which is an example of cross-subframe scheduling. In such case, the downlink subframe 556 may include two UE-specific search spaces, one based on subframe index 0 and another based on subframe index 1. The UE-specific search spaces may be configured as defined in 3GPP Technical Specification 36.213. For further example, a subframe 560 (downlink subframe 2) may schedule more than one downlink or uplink subframe, e.g., all of downlink subframes 2-4, and uplink subframes 6-8 564, 566, 568. In such case, the downlink subframe 560 may include three UE-specific search spaces, based respectively on subframe indices 2-4. Subframes that are scheduled by an earlier subframe may be devoid of scheduling control, and may therefore resemble an ABS in that such subframes lack certain control signals.

Various issues and opportunities arise from the use of ABS in carrier aggregation contents, and from the use of similar control-less subframes in cross-subframe scheduling in both CA and non-CA contexts. One issue is whether or not the UE should be made aware of the ABS or similar control-less subframe configuration. If the UE is aware of the ABS or similar control-less subframe configuration, another issue is how the UE and macro node should handle the ABS or similar control-less subframes from a control perspective.

When cross-frame scheduling is used, issues arise concerning the maximum number of blind decoding operations that may be required for the UESS and CSS, and how to handle cross-scheduled subframes. Another issue is how to handle Physical Uplink Scheduling Channel (PUSCH) transmissions from the mobile entity, including semi-persistent scheduling, when there is no corresponding PDCCH in an ABS or cross-scheduled frame.

Awareness of Control-Less Subframes

In an aspect, a network entity (e.g., a base station) may provide an indication to each mobile entity, such that each mobile entity can determine which subframes are devoid of designated downlink control signals (e.g., control-less subframes or ABSs). A subframe may be devoid of designated downlink control signals for all mobile entities in a cell. In the alternative, or in addition, a subframe may be devoid of designated downlink control signals for a particular mobile entity, or for a particular group of mobile entities. A subframe may be considered control-less if the subframe lacks all designated downlink controls (both legacy and new controls), or in the alternative, if the subframe lacks only designated legacy control signals while including a new, non-legacy control signal in the data region. If a control-less subframe lacks designated downlink control signals for particular mobile entities, it may still contain downlink or uplink scheduling signals (e.g., PDSCH or PUSCH) in corresponding scheduling subframes for these particular mobile entity or entities (non-legacy control signal based PDSCH, and/or PUSCH based on H-ARQ timing).

The network entity may provide the indication of control-less subframes to mobile entities using explicit signaling or implicit signaling. In explicit signaling, the network entity may provide an explicit dedicated signal for identifying ABS signaling. In the alternative, the network entity may use an implicit signaling method that is not associated with ABS signaling. In implicit signaling, the indication may be provided without using an explicit message. For example, a network entity may provide an implicit indication in association with cross-frame scheduling. In this approach, a mobile entity may recognize subframes that are cross-scheduled, and thereby be informed that the cross-scheduled subframes do not carry any physical downlink control channel signals for the mobile entity. A cross-scheduled subframe, for example, may include a PDSCH/PUSCH subframe that is scheduled by a different PDSCH/PUSCH subframe. There may be several reasons why the subframe does not carry downlink control signals. For example, the subframe may be an ABS, or the subframe may be subject to heavy interference from neighbor cells.

Using the indication of which subframes lack downlink control signals, the mobile entity may reduce the number of blind decoding operations that it would otherwise perform, for example, the mobile entity may perform fewer or no blind decodes for a subframe that it identifies as being control-less. In an aspect, the mobile entity may completely skip detection of any downlink control signal in a subframe that is indicated as being a control-less subframe. In such case, the mobile entity monitors control signals dependent on the subframe status, and specifically, whether or not the subframe is indicated as a control-less subframe. Advantages of this approach may include battery power conservation, reduction in use of processing power, and reducing occurrence of false alarms and any related ACK/NAK or PUSCH signaling.

PUSCH Retransmission

A PUSCH transmission may be scheduled in a PDCCH subframe, while its retransmission instance falls into a control-less subframe based on an uplink H-ARQ timing. This situation may be possible, for example, if timing of the retransmission is controlled by an uplink H-ARQ timing having a different periodicity from a periodicity of the control-less subframes.

In this event, the mobile entity may suspend non-adaptive PUSCH retransmission in the control-less subframe in which it falls, on the condition that the mobile entity can (and has) determined that the subframe at issue is a control-less subframe. Instead, the mobile entity may provide a positive ACK from the physical layer to the Media Access Control (MAC) layer in response to suspending retransmission. Conversely, if the mobile entity is not able to detect control-less subframes, and therefore cannot determine whether or not the subframe at issue is control-less, it may attempt a PUSCH retransmission in a control-less subframe as result of a PDCCH false alarm.

In the alternative, the mobile entity may support an adaptive, or non-adaptive, retransmission in the control-less subframe. This alternative also requires that the mobile entity be capable of detecting whether or not a particular subframe is a control-less subframe. A non-adaptive retransmission may include the mobile entity retransmitting via a new PHICH design or a cross-subframe PHICH. An adaptive retransmission may include the mobile entity using an adaptive PUSCH transmission supported by a new PDCCH signaling or cross-subframe scheduling. For example, a new PDCCH design may follow the relay PDCCH (R-PDCCH) design or a variation of it. Similarly, a new PHICH design may also follow the same design philosophy as R-PDCCH. According to a further alternative, the retransmission may be performed in another PDCCH corresponding subframe adapted to a control-less configuration. For example, the mobile entity may retransmit in the first uplink subframe corresponding to a PDCCH subframe at or after 4 ms, essentially revising the H-ARQ timeline.

Semi-Persistent Scheduling

Semi-Persistent Scheduling (SPS) may be supported for uplink transmissions, using a defined periodicity, for example, 10 ms or 20 ms. The SPS periodicity may not be consistent with periodicity of control-less subframes. In such cases, issues similar to those involved with PUSCH retransmission by H-ARQ timing may arise. An SPS may be activated in a PDCCH subframe, but some SPS subframes may coincide with control-less subframes during the active period of the SPS.

In an aspect, SPS may not be allowed to coincide with control-less subframes to prevent PUSCH transmissions in these subframes. For example, an SPS may be configured with a periodicity that is not a multiple of a control-less subframe pattern periodicity; e.g., a 20 ms SPS periodicity where the control-less subframe periodicity is 8 ms. This alternative may conserve power where the mobile entity can use discontinuous receiving or transmission. In the alternative, scheduling of SPS may be allowed to fall in control-less subframes, and treated in the same way regardless of whether the frame it falls in is control-less or not.

Managing Maximum Blind Decoding Attempts

Various alternatives may be used to manage blind decoding in PDCCH subframes enabling cross-subframe decoding. In a first alternative, the mobile entity may not increase the maximum number of blind decoding attempts it makes, for subframes enabling cross-subframe decoding. The number of blind decoding attempts may therefore be the same as for the case of subframe without cross-frame scheduling described above. In this approach, the base station (e.g., eNB) should schedule PDCCH in multiple subframes so as to not require more than the static maximum number of blind decoding attempts. This implementation may introduce undesirable scheduling restrictions on the eNB.

In the alternative, the maximum number of blind decoding attempts may be increased by some amount (e.g., a linear increase) in PDCCH subframes enabling cross-subframe decoding. Again, this may be accomplished by scheduling the PDCCH at the eNB so as to hold the number of blind decoding candidates to a defined number consistent with an allowed increase. Determining an amount by which to increase the number of blind decodes may be performed as a function of a number of UESSs in each PDCCH subframe. In CA, the number of search spaces on the same carrier may be individually defined as a function of UE ID and the Cross-Carrier Indicator Field (CIF). The number of UESSs may also be a function of the subframe index, which may range from 0 to 9, allowing up to 10 possible UESSs for a give aggregation level. In one approach, the increased in blind decodes may be the same as in the CA case, which is offset based on a layer 3 configured offset or simply a subframe difference. In this case, the amount of increase may be linearly proportional to the number of search spaces as defined by one or more cross-subframe offsets.

In another approach, the increase in maximum blind decoding operations may be individually defined for a search space based on a parameter. The parameter may be, for example, layer 3 configured or simply the cross-subframe index. For example, as illustrated in FIG. 5D, if the cross-subframe index indicates cross scheduling one subframe offset (e.g., from subframe 0 to subframe 1), the UESS from subframe 1 may be moved to subframe 0, but retained in the same location relative to the subframe. In such case, the mobile entity may perform twice the number of blind decoding operations for subframe 0 (based on the aggregation level), and no blind decoding in subframe 1. The base station may schedule the PDCCH channel in subframe 0 accordingly. For further example, where subframe 2 cross-schedules for subframes 3 and 4, the UESSs for subframes 3 and 4 may be moved to subframe 2. In this case, the mobile entity may perform a trebled number of blind decodes in subframe 2, and no blind decoding in subframes 3 and 4. This alternative may make use of the same hashing function as used in 3GPP Release 8 for blind decoding. Again, the base station may schedule the PDCCH channel in subframe 0 accordingly. Yet another alternative may be to share UE specific search spaces, similarly to cross-carrier signaling. In this alternative, a UESS may be designated for an identified group of subframes to share for a particular mobile entity.

For CSS, it may also be desirable to increase a number of blind decoding operations for PDCCH subframes enabling cross-subframe scheduling. This may be accomplished, for example, by beginning decoding at control channel element 0 (as in 3GPP Release 8), but increasing the number of PDCCH decoding candidates linearly. For example, the number of blind decodes as per the pertinent aggregation level may be multiplied by "N," where N is the number of subframes being scheduled by the PDCCH subframe. In another alternative, the number of blind decoding operation may be held steady (i.e., not increased) and instead, a smaller aggregation level may be used, such as 1 or 2, for the CSS in the PDCCH subframe. Yet another alternative may include using dedicated signaling and relying on Downlink Control Information (DCI) format 1A in the UESS for the CSS, as well.

Example Methodologies and Apparatus

In view of exemplary systems shown and described herein, methodologies that may be implemented in accordance with the disclosed subject matter, will be better appreciated with reference to various flow charts. For purposes of simplicity of explanation, methodologies are shown and described as a series of acts/blocks, but the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

FIG. 6 shows a method 600 for managing downlink control signals from a base station of a wireless communications system (WCS) using a frequency and time denoted resource grid divided into subframes. The network entity may be an eNB, or other base station (e.g., Home Node B, etc.) of a wireless communications network. The method 600 may include, at 610, receiving a first indication from a network entity of the WCS to maintain a designated set of subframes on a common carrier devoid of designated downlink control signals in transmissions from the base station. The instructions may include information enabling a base station to determine which subframes to include in the designated set of subframes. The instructions may be received by the base station at any time prior to configuring subframes for transmission including the designated set of subframes, and may be static, semi-static, or variable in nature. The designated set of subframes may be generated at a base station at some future time from when the instruction is received, and need not be in existence at the time the instruction is received. The designated set of subframes may be, for example, Almost Blank Subframes, or another type of control-less subframes. The designated set of subframes may be included in a larger set of subframes, wherein the larger set of subframes includes certain subframes for carrying the designated downlink control signals. The designated downlink control signals may include, for example, physical downlink control channel signals that are candidates for blind decoding, and may exclude certain other downlink signals, for example, PSS, SSS, PBCH, SIB1, paging, and/or PRS signals.

The method 600 may further include, at 620, the base station providing a second indication in a wireless transmission to a mobile entity enabling identification of subframes in the designated set prior to decoding the subframes. The second indication may be an explicit data element such as one or more dedicated bits, or may be an implicit indication implied by an arrangement of other downlink signals or cross-subframe scheduling. The second indication should convey sufficient information to a receiver, e.g., a mobile entity, to enable the receiver to identify which of a larger set of subframes that it will be receiving will be included in the designated set of subframes, to enable prior identification of the designated set. For example, prior identification may be enabled by communicating a pattern or arrangement of the designated set of subframes in a larger set of subframes. For more detailed example, the base station may provide an indication that every "$N^{th}$" (e.g., $2^{nd}$, $3^{rd}$, $4^{th}$, etc.) subframe will be a control-less subframe. Subsequent to providing the second indication, the base station may transmit subframes of data, including the designated set of control-less subframes that are configured as indicated by the operation 620.

FIGS. 7, 8, 9A, 9B show further optional operations or aspects 700, 800, 900 and 950 that may be performed by the base station in conjunction with the method 600 for managing downlink control signals. The operations shown in FIGS. 7, 8, 9A, 9B are not required to perform the method 600. Operations 700, 800 900 and 950 are independently performed and generally not mutually exclusive unless positioned on opposing branches from a block. Any one of such independent and not mutually exclusive operations may be performed regardless of whether another downstream or upstream operation is performed. If the method 600 includes at least one operation of FIGS. 700, 800 900 and 950, then the method 600 may terminate after the at least one operation, without necessarily having to include any subsequent downstream operation(s) that may be illustrated. Conversely, operations that are positioned directly on opposing branches of a block may be mutually exclusive alternatives in any particular instance of the method.

Referring to FIG. 7, the method 600 may include one or more of the additional operations 700. For example, providing the second indication as shown at 620 of method 600 may further include, at 710, the base station indicating the designated set of subframes using cross-subframe scheduling. For example, the base station may use cross-subframe scheduling for the PDCCH, wherein PDCCH signals for one subframe are allocated to a different subframe. The base station may provide an indication of the cross-subframe scheduling pattern to the mobile entity. In the alternative, or in addition, a scheduling pattern may be designated in advance by adoption of a shared protocol by the base station and mobile entity. In either case, the use of a scheduling pattern for cross-subframe control signaling may be used as an implicit indication of the designated set of subframe that are devoid of certain control signals.

The method 600 may further include, at 720, the base station maintaining the designated set of subframes devoid of the designated downlink control signals, according to alternatives shown at 730 and 740. In an alternative 730, the method 600 may include maintaining the designated set of subframes devoid of the designated downlink control signals for a subset of mobile entities served by the base station, wherein the subset includes one or more mobile entities and less than all mobile entities served by a based station. For example, the designated set of subframes may be devoid of downlink control signals in a UESS. In another alternative 740, the method 600 may include maintaining the designated set of subframes devoid of the designated downlink control signals for all mobile entities served by the base station. For example, the designated set of subframes may be devoid of downlink control signals in a CSS.

Referring to FIG. 8, the method 600 may include the additional operations 800, including, at 810 receiving a physical uplink shared channel (PUSCH) transmission in an uplink subframe associate with the designated set of subframes, based on an uplink hybrid automatic repeat request (H-ARQ) timing relationship. A PUSCH transmission may be scheduled in a PDCCH subframe, while its retransmission instance falls into a control-less subframe. Accordingly a mobile entity receiving the designated set of subframes may suspend non-adaptive PUSCH retransmission in the control-less subframe in which it falls, based on the indication from the base station. In the alternative, the mobile entity receiving the designated set of control-less subframes may support an adaptive, or non-adaptive, retransmission in the control-less subframe. Further details are discussed herein in connection with aspects pertaining to mobile entities.

The method 600 may include, at 820, receiving an adaptive PUSCH transmission scheduled by a control signal using a new control region in one of the designated set of subframes based on the uplink H-ARQ timing relationship. The method 600 may include, at 830, the base station receiving a semi-persistent scheduling (SPS) transmission in the uplink subframe Referring to FIG. 9A, the method 600 may include the additional operations 900, including, at 910, scheduling PDCCH signals using a legacy control channel region only in subframes other than the designated set of control-less subframes to a mobile entity. Scheduling the PDCCH signals may include, at 920, maintaining a constant number of blind decoding operations required for PDCCH signals irrespective of how many designated sets of subframes are devoid of PDCCH signals, for example by scheduling the PDCCH signals so as to require the same number of blind decoding operations as when transmitting PDCCH signals in subframes not enabling cross-subframe scheduling. The method 600 may include, at 930, the base station scheduling the PDCCH signals in a first subframe that includes information scheduling downlink data transmissions for a plurality subframes to the mobile entity. In the alternative, or in addition, the method 600 may include, at 940, allocating a plurality of search spaces specific to the mobile entity in the first subframe, wherein each search space is based at least in part on the subframe index of the corresponding downlink data transmission.

Figure 9A:
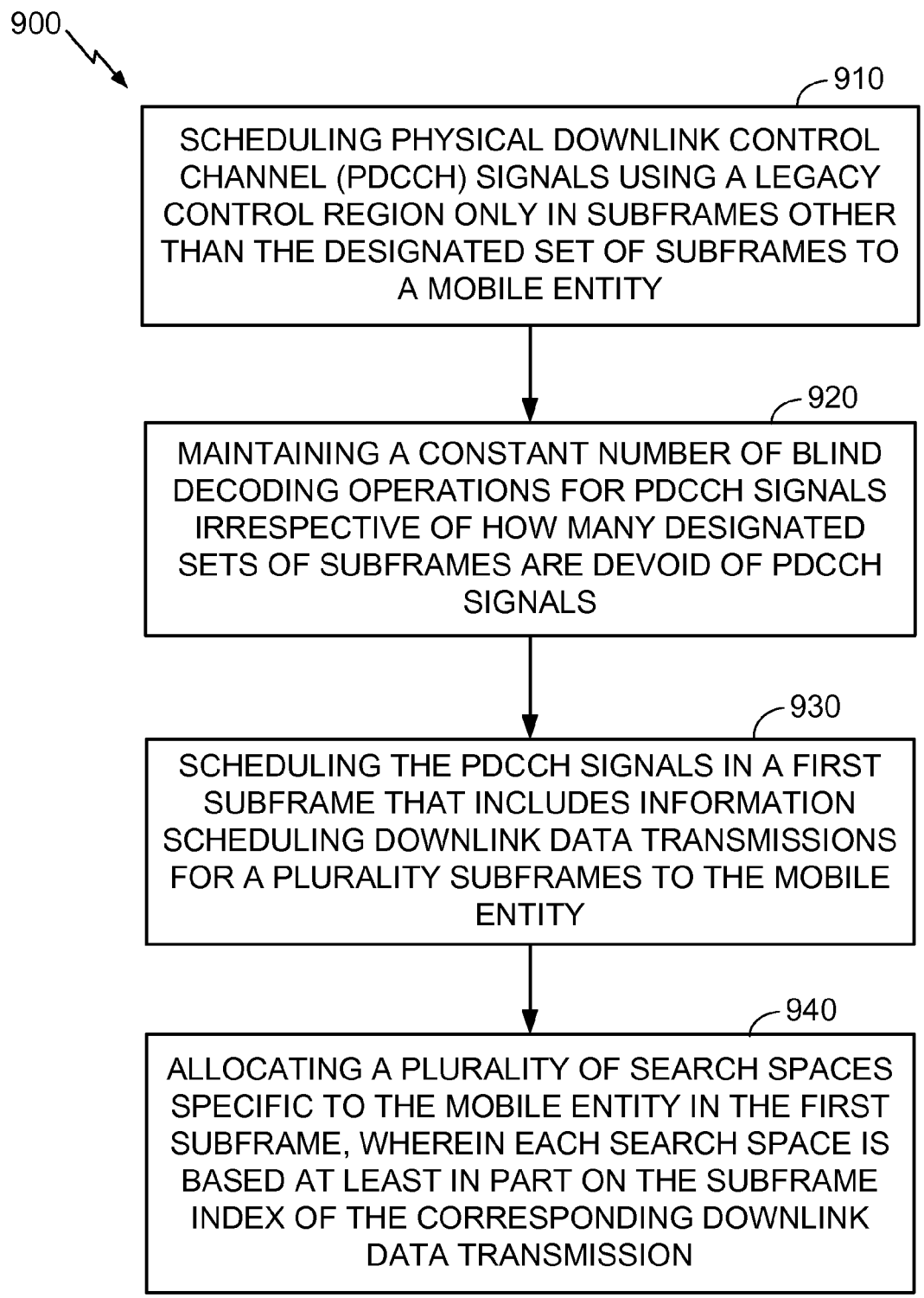
Figure 9B:
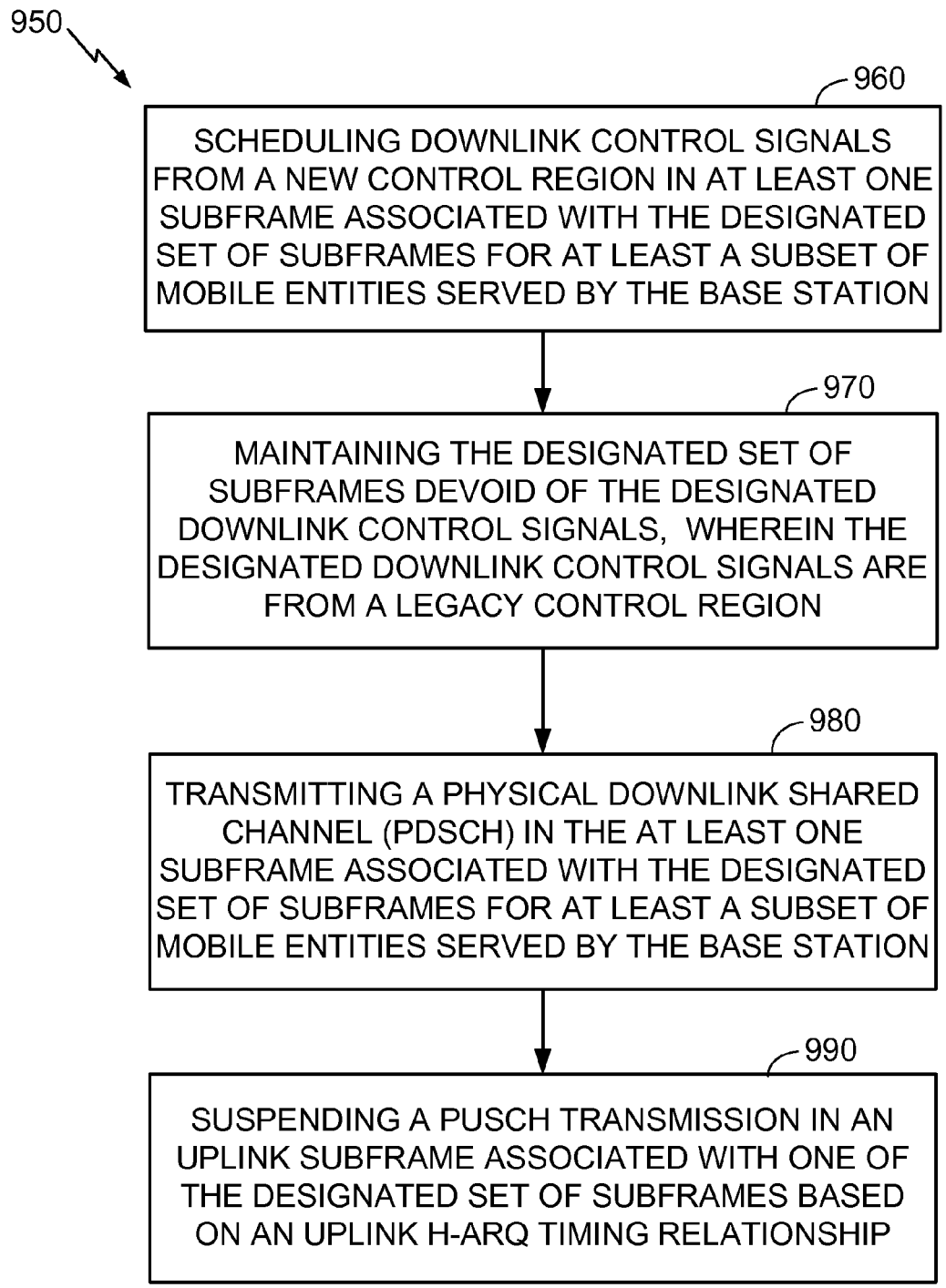

Referring to FIG. 9B, the method 600 may include, at 960, scheduling downlink control signals from a new control region in at least one subframe associated with the designated set of subframes, for at least a subset of mobile entities served by the base station. The new control region by be defined for cross-subframe signaling and included in a designated subframe for carrying control signaling for the designated set of control-less subframes. In the alternative, or in addition, the method may include, at 970, maintaining the designated set of subframes devoid of the designated downlink control signals, wherein the designated downlink control signals are from a legacy control region. In another aspect, the method 600 may include, at 980, transmitting a PDSCH in the at least one subframe associated with the designated set of subframes for at least a subset of mobile entities served by the base station. The method 600 may further include, at 990, suspending a PUSCH transmission in an uplink subframe associated with one of the designated set of subframes based on an uplink H-ARQ timing relationship.

Figure 10:
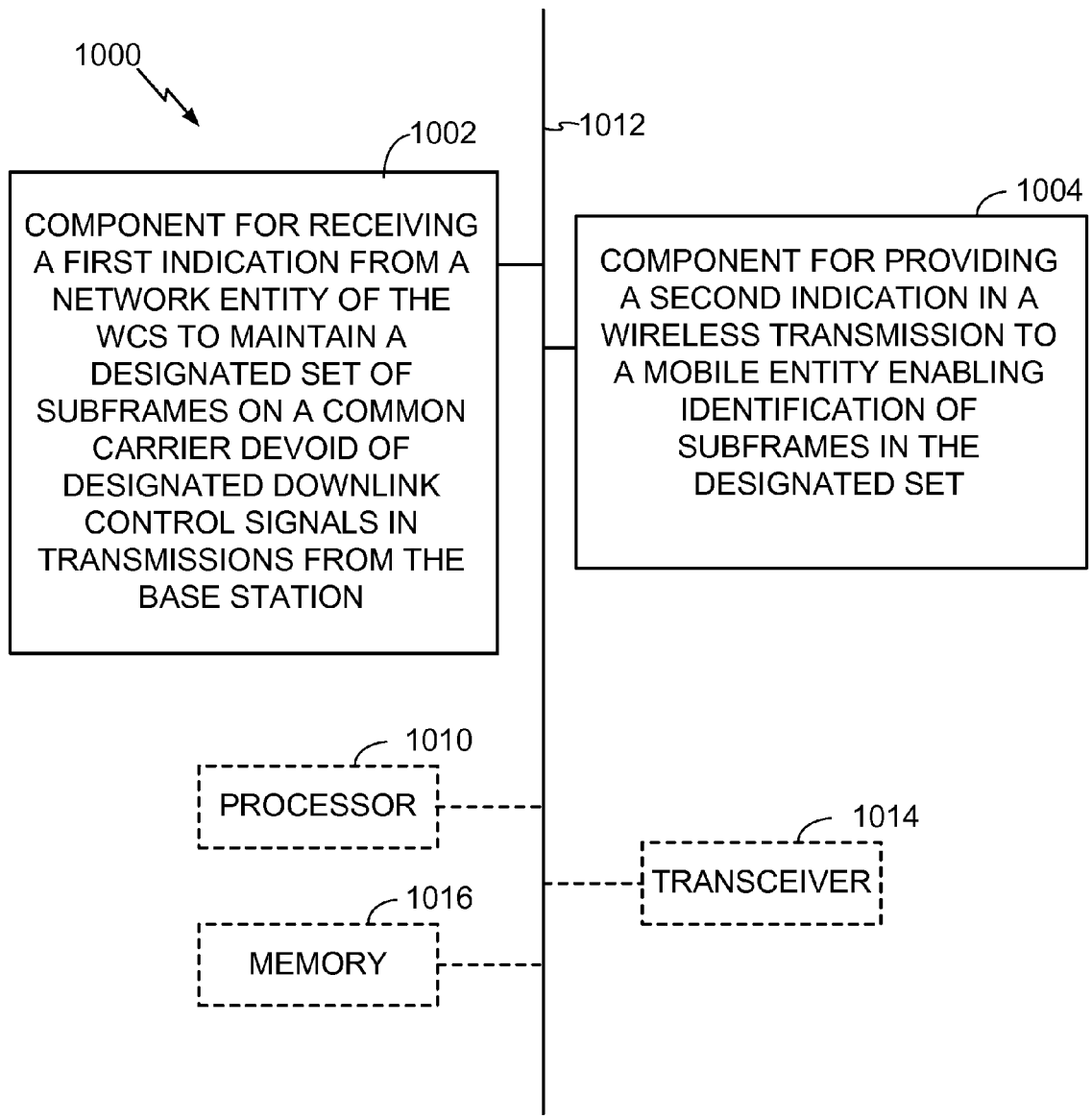
FIG. 10 is a block diagram illustrating an embodiment of an apparatus for managing downlink control signals from a base station, in accordance with the methodologies of FIGS. 6-9B.

With reference to FIG. 10, there is provided an exemplary apparatus 1000 that may be configured as a network entity in a wireless network, or as a processor or similar device for use within the network entity, for providing a wireless signal organized into subframes. The apparatus 1000 may include functional blocks that can represent functions implemented by a processor, software, or combination thereof (e.g., firmware).

As illustrated, in one embodiment, the apparatus 1000 may include an electrical component, module or means 1002 for receiving a first indication from a network entity of the WCS to maintain a designated set of subframes on a common carrier devoid of designated downlink control signals in transmissions from the base station. For example, the electrical component or means 1002 may include at least one control processor 1010 coupled to a transceiver 1014 or the like and to a memory 1016 with instructions for receiving instructions from a network entity concerning subframe configuration. The control processor 1010 may operate an algorithm, which may be held as program instructions in the memory component 1016. The algorithm may include, for example, receiving a signal from a network component, and processing the signal to discover the instruction defining the designated set of subframes, according to a predetermined communications protocol.

The apparatus 1000 may include an electrical component or means 1004 for providing a second indication in a wireless transmission to a mobile entity enabling identification of subframes in the designated set. For example, the electrical component or means 1004 may include at least one control processor 1010 coupled to a transceiver 1014 or the like and to a memory 1016 holding instructions for transmitting the second indication to one or more mobile entities in advance of a transmission including subframes. The control processor 1010 may operate an algorithm, which may be held as program instructions in the memory component 1016. The algorithm may include, for example, setting a data bit or bits to a predetermined value that indicates the designated set of subframes according to a predetermined protocol, or sending signaling that implies use of a predefined set of control-less subframes according to an implied signaling protocol. The apparatus 1000 may include similar electrical components for performing any or all of the additional operations 700, 800, 900 or 950 described in connection with FIGS. 7, 8, 9A, 9B, which for illustrative simplicity are not shown in FIG. 10.

In related aspects, the apparatus 1000 may optionally include a processor component 1010 having at least one processor, in the case of the apparatus 1000 configured as a network entity. The processor 1010, in such case, may be in operative communication with the components 1002-1004 or similar components via a bus 1012 or similar communication coupling. The processor 1010 may effect initiation and scheduling of the processes or functions performed by electrical components 1002-1004. The processor 1010 may encompass the components 1002-1004, in whole or in part. In the alternative, the processor 1010 may be separate from the components 1002-1004, which may include one or more separate processors.

In further related aspects, the apparatus 1000 may include a radio transceiver component 1014. A stand alone receiver and/or stand alone transmitter may be used in lieu of or in conjunction with the transceiver 1014. In the alternative, or in addition, the apparatus 1000 may include multiple transceivers or transmitter/receiver pairs, which may be used to transmit and receive on different carriers. The apparatus 1000 may optionally include a component for storing information, such as, for example, a memory device/component 1016. The computer readable medium or the memory component 1016 may be operatively coupled to the other components of the apparatus 1000 via the bus 1012 or the like. The memory component 1016 may be adapted to store computer readable instructions and data for performing the activity of the components 1002-1004, and subcomponents thereof, or the processor 1010, the additional aspects 700, 800 or 900, 950, or the methods disclosed herein. The memory component 1016 may retain instructions for executing functions associated with the components 1002-1004. While shown as being external to the memory 1016, it is to be understood that the components 1002-1004 can exist within the memory 1016.

Figure 11:
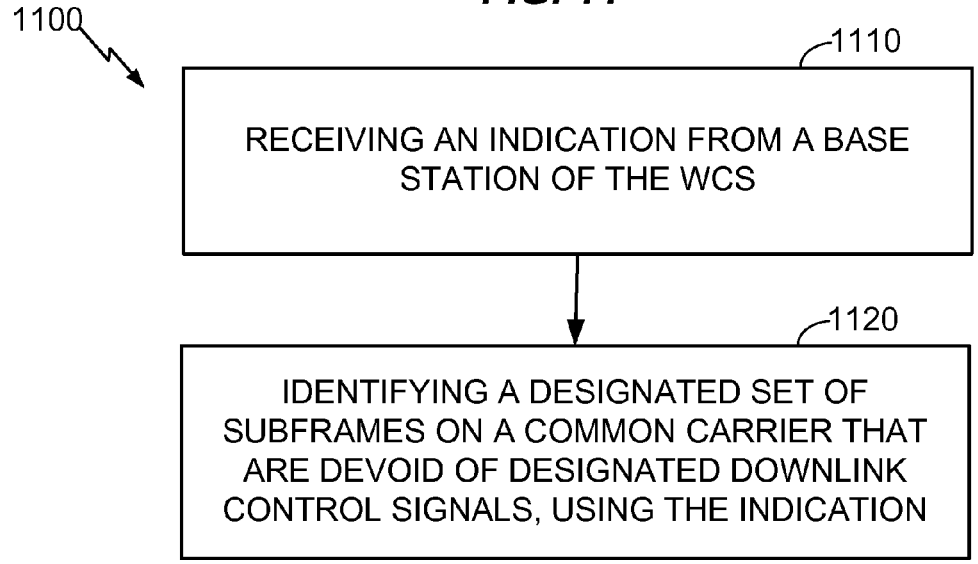

A mobile entity receiving downlink control signals from a base station performing the method 600 may perform a method 1100 to make use of information from the base station, as shown in FIG. 11. The mobile entity may comprise an entity of any of the various forms described herein, for example, a UE. The method 1100 may include using downlink control signals on a common carrier at a mobile entity of a wireless communications system using a frequency and time denoted resource grid divided into subframes. The method 1100 may include, at 1110, receiving an indication for identifying control-less subframes from a base station of the WCS. The indication may be an explicit indication using dedicated signaling, or an implicit indication, for example using a scheduling pattern for cross-subframe signaling. An implicit indication may be received according to a predefined protocol adopted by the mobile entity and the base station providing the indication. Such an implicit indication may be actually received when subframes according to the defined cross-scheduling pattern are received.

The method 1100 may further include, at 1120, the mobile entity, identifying a designated set of subframes on a common carrier that are devoid of designated downlink control signals, using the indication. The designated set of subframes may be, for example, Almost Blank Subframes, or another type of control-less subframes. The designated set of subframes may be included in a larger set of subframes, wherein the larger set of subframes includes certain subframes for carrying the designated downlink control signals. The designated downlink control signals may include, for example, physical downlink control channel signals that are candidates for blind decoding, and may exclude certain other downlink signals, for example, PSS, SSS, PBCH, SIB1, paging, and/or PRS signals. Identifying the designated control-less subframes may include detecting or determining which subframes are included in the designated set of control-less subframes. The act of identification may be manifested at the mobile entity by a tangible act taken in response to whether or not a particular subframe is identified as one of the designated set of control-less subframes. As noted above, the mobile entity may control and reduce a number of blind decoding operations needed to process downlink control signals, by identifying the control-less subframes. This may reduce overhead processing requirements and speed up processing of downlink control signals.

FIGS. 12-15 show further optional operations or aspects 1200, 1300, 1400, 1450 and 1500 that may be performed by the mobile entity in conjunction with the method 1100. The operations shown in FIGS. 12-15 are not required to perform the method 1100. Unless positioned directly on opposing branches off of an upstream block, operations are independently performed and not mutually exclusive. Therefore any one of such operations may be performed regardless of whether another downstream or upstream operation is performed. If the method 1100 includes at least one operation of FIGS. 12-15, then the method 1100 may terminate after the at least one operation, without necessarily having to include any subsequent downstream operation(s) that may be illustrated. Conversely, operations that are positioned directly on opposing branches of a block may be mutually exclusive alternatives in any particular instance of the method.

Figure 12:
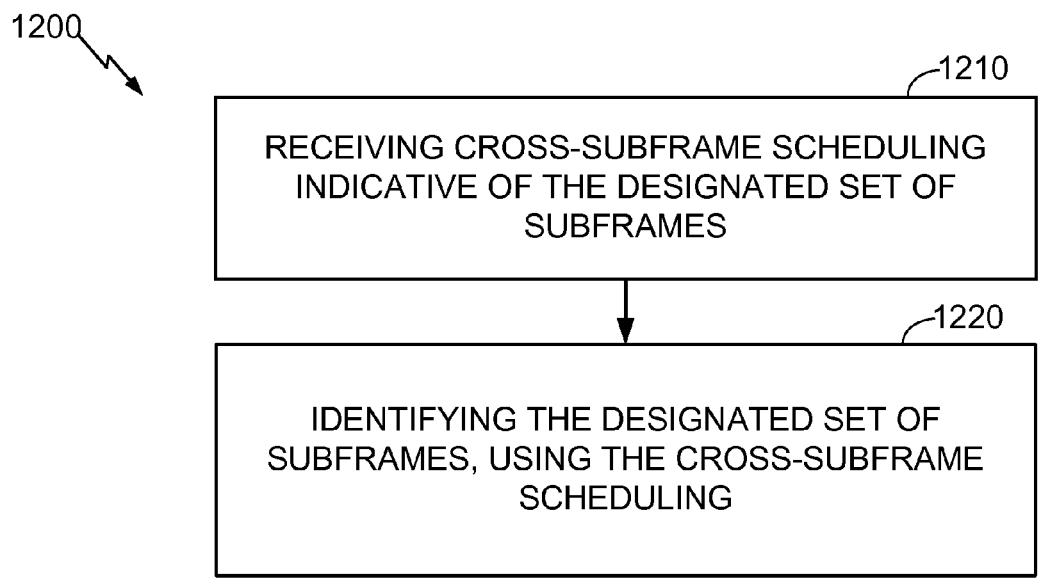

Referring to FIG. 12, method 1100 may include one or more of the additional operations 1200. The method 1100 may further include, at 1210, the mobile entity receiving cross-subframe scheduling indicative of the designated set of subframes. As indicated at 1120 and 1220, the mobile entity may subsequently identify the designated set of control-less subframes, using the cross-subframe scheduling.

Referring to FIG. 13, the method 1100 may include one or more of the additional operations 1300. The method 1100 may further include, at 1310, transmitting a PUSCH in an uplink subframe associated with one of the designated set of subframes based on a H-ARQ timing relationship. The method 1100 may further include, at 1320, suspending retransmission of requested repeat data in subframes connected with the designated set of subframes based on an H-ARQ timing relationship.

The method 1100 may further include, at 1330, providing a positive ACK from a physical layer to a MAC layer within the mobile entity, to cause the suspending retransmission of requested repeat data when an H-ARQ subframe coincides with a control-less subframe. If the mobile entity is not able to detect control-less subframes, and therefore cannot determine whether or not the subframe at issue is control-less, it may attempt a PUSCH retransmission in a control-less subframe, causing an undesirable PHICH non-contiguous transmission or ACK resulting in suspension of PUSCH retransmissions, or less likely, a PDCCH false alarm.

In the alternative, the mobile entity may support an adaptive, or non-adaptive, retransmission in the control-less subframe. An adaptive retransmission may include the mobile entity using an adaptive PUSCH transmission supported by relay PHICH signaling or cross-subframe scheduling. For example, the method 1100 may include, at 1340, retransmitting requested repeat data in at least one subframe connected with the designated set of subframes based on a H-ARQ timing relationship, that is, when an H-ARQ subframe coincides with a control-less subframe, via one of a cross-subframe physical hybrid ARQ indicator channel (PHICH) or a relay PHICH. According to a further alternative, the retransmission may be performed in another PDCCH corresponding subframe adapted to a control-less configuration. For example, the mobile entity may retransmit in the first uplink subframe corresponding to a PDCCH subframe at or after 4 ms or some other offset amount. In this alternative, the mobile entity essentially revises the H-ARQ timeline.

Referring to FIG. 14A, the method 1100 may include one or more of the additional operations 1400. The method 1100 may further include, at 1410, transmitting an adaptive PUSCH transmission scheduled by a control signal using a new control region in an uplink subframe associated with the designated set of subframes based on the uplink H-ARQ timing relationship. The method 1100 may further include, at 1420, transmitting a semi-persistent scheduling (SPS) transmission in the uplink subframe. A second set of subframes may be devoid of SPS signals, wherein the second set of subframes are connected with the designated control-less subframes based on an H-ARQ timing relationship. Subframes devoid of SPS signals may be scheduled at an integer multiple of, and coinciding with, a periodicity for H-ARQ subframes. In the alternative, a second set of subframes may include SPS signals, wherein the second set of subframes are connected with the designated control-less subframes based on an H-ARQ timing relationship. Subframes including SPS signals may be scheduled at a periodicity that is not an integer multiple of, and coinciding with, a periodicity for H-ARQ subframes. An SPS subframe may be configured with a periodicity that is not a multiple of a shorter periodicity for a control-less subframe pattern, such as, for example, a 20 ms SPS periodicity where the control-less subframe periodicity is 8 ms. In this example, the control-less subframes are received at a different time from the SPS for uplink transmission for only half of the SPS cycles (because 40 is a multiple of 8 and therefore falls on a coincident cycle, but 20 is not). In one approach SPS may be disallowed when it falls in control-less subframes, which may conserve power where the mobile entity can use discontinuous receiving or transmission. In the alternative, SPS may be allowed in control-less subframes.

Referring to FIG. 14B, the method may include, at 1460, receiving downlink control signals in a new control region in at least one subframe associated with the designated set of subframes. The method may further include, at 1470, receiving a PDSCH in the at least one subframe associated with the designated subframes.

Referring to FIG. 15, the method 1100 may include one or more of the additional operations 1500. The method 1100 may further include, at 1510, receiving PDCCH signals only in subframes other than the designated set of control-less subframes. A control-less subframe pattern may be implicitly indicated by cross-subframe scheduling from the base station. Accordingly, the method 1100 may further include, at 1520, performing a number of blind decoding operations according to a scheduling arrangement of the PDCCH signals. The cross-subframe scheduling arrangement may be provided by the base station according to various alternatives. In one alternative, the method 1100 may further include, at 1530, performing a fixed number of blind decoding operations for PDCCH signals irrespective of how many designated sets of subframes are devoid of PDCCH signals. In this alternative, the number of blind decoding operations is not increased in comparison to non cross-scheduled subframes, but the base station may suffer reduced scheduling flexibility. Other alternatives may include performing an increased number of blind decoding operations for PDCCH signals in cross-subframe scheduled subframes. These alternatives may include, for example, a linear increase, or some increase less than a linear increase. The amount of increase may be configurable by the base station. These alternatives may permit greater scheduling flexibility for the base station, at the expense of more complexity and a larger number of blind decoding operations at the mobile entity.

The method 1100 may further include, at 1540, receiving the PDCCH signals in a first subframe that includes information scheduling downlink data transmissions for a plurality of subframes to the mobile entity. The method 1100 may further include, at 1550, accessing a plurality of search spaces specific to the mobile entity in the first subframe, wherein each search space is based at least in part on the subframe index of the corresponding downlink data transmission.

Figure 16:
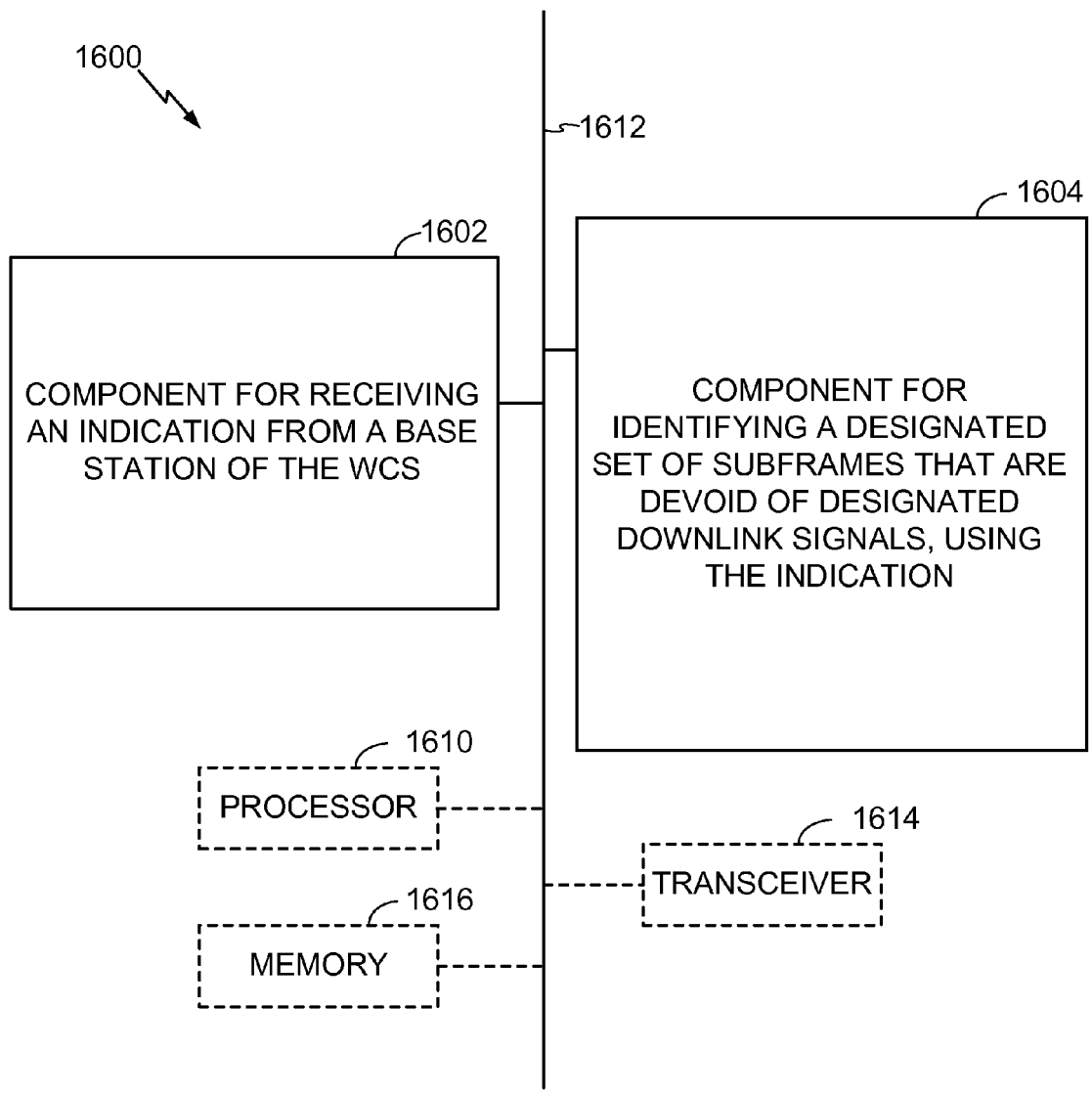
FIG. 16 is a block diagram illustrating an embodiment of an apparatus for using downlink control signals, in accordance with the methodologies of FIGS. 11-15.

With reference to FIG. 16, there is provided an exemplary apparatus 1600 that may be configured as a mobile entity or UE in a wireless network, or as a processor or similar device for use within the ME or UE, for processing downlink control signals from a base station. The apparatus 1600 may include functional blocks that can represent functions implemented by a processor, software, or combination thereof (e.g., firmware).

In one embodiment, the apparatus 1600 may include an electrical component, means or module 1602 for receiving an indication from a base station pertaining to a designated set of subframes devoid of designated downlink control signals. For example, the electrical component 1602 may include at least one control processor 1610 coupled to a transceiver 1614 or the like and to a memory 1616 with instructions for receiving and recognizing the indication in the correct context. The control processor 1610 may operate an algorithm, which may be held as program instructions in the memory component 1616. The algorithm may include, for example, receiving data or signals from the base station and recognizing the data or signals as an express or implied indication of a particular set of subframes that are devoid of designated control signals.

The apparatus 1600 may include an electrical component 1604 for identifying a designated set of subframes on a common carrier that are devoid of designated downlink control signals, using the indication. For example, the electrical component 1604 may include at least one control processor 1610 coupled to a transceiver 1614 or the like and to a memory 1616 holding instructions for indentifying control-less subframes using information provided by the indication. The control processor 1610 may operate an algorithm, which may be held as program instructions in the memory component 1616. The algorithm may include, for example, synchronizing with a system signal, determining a subframe index of subframes transmitted on a common carrier based on a synchronization signal, and identifying the control-less subframes based on subframe index values and the set indication provided by the component 1602. The apparatus 1600 may include similar electrical components for performing any or all of the additional operations 1200, 1300, 1400, 1450 or 1500 described in connection with FIGS. 12-15, which for illustrative simplicity are not shown in FIG. 16.

In related aspects, the apparatus 1600 may optionally include a processor component 1610 having at least one processor, in the case of the apparatus 1600 configured as a mobile entity. The processor 1610, in such case, may be in operative communication with the components 1602-1604 or similar components via a bus 1612 or similar communication coupling. The processor 1610 may effect initiation and scheduling of the processes or functions performed by electrical components 1602-1604. The processor 1610 may encompass the components 1602-1604, in whole or in part. In the alternative, the processor 1610 may be separate from the components 1602-1604, which may include one or more separate processors.

In further related aspects, the apparatus 1600 may include a radio transceiver component 1614. A stand alone receiver and/or stand alone transmitter may be used in lieu of or in conjunction with the transceiver 1614. In the alternative, or in addition, the apparatus 1600 may include multiple transceivers or transmitter/receiver pairs, which may be used to transmit and receive on different carriers. The apparatus 1600 may optionally include a component for storing information, such as, for example, a memory device/component 1616. The computer readable medium or the memory component 1616 may be operatively coupled to the other components of the apparatus 1600 via the bus 1612 or the like. The memory component 1616 may be adapted to store computer readable instructions and data for performing the activity of the components 1602-1604, and subcomponents thereof, or the processor 1610, or the additional aspects 1200, 1300, 1400, 1450 or 1500, or the methods disclosed herein. The memory component 1616 may retain instructions for executing functions associated with the components 1602-1604. While shown as being external to the memory 1616, it is to be understood that the components 1602-1604 can exist within the memory 1616.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any non-transient tangible medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually hold data encoded magnetically, while discs hold data encoded optically. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for managing downlink control signals on a common carrier from a base station of a wireless communications system (WCS) using a frequency and time denoted resource grid divided into subframes, the method comprising:
receiving a first indication from a network entity of the WCS to maintain a designated set of subframes on a common carrier devoid of designated downlink control signals in transmissions from the base station;
providing a second indication in a wireless transmission to a mobile entity enabling identification of subframes in the designated set; and
receiving a physical uplink shared channel (PUSCH) transmission in an uplink subframe associated with the designated set of subframes based on an uplink hybrid automatic repeat request (H-ARQ) timing relationship.

2. The method of claim 1, further comprising maintaining the designated set of subframes devoid of the designated downlink control signals for a subset of mobile entities served by the base station.

3. The method of claim 1, further comprising maintaining the designated set of subframes devoid of the designated downlink control signals for all mobile entities served by the base station.

4. The method of claim 1, wherein providing the second indication further comprises indicating the designated set of subframes using cross-subframe scheduling.

5. The method of claim 1, further comprising maintaining the designated set of subframes devoid of the designated downlink control signals, wherein the designated downlink control signals are from a legacy control region.

6. The method of claim 1, further comprising scheduling downlink control signals from a new control region in at least one subframe associated with the designated set of subframes for at least a subset of mobile entities served by the base station.

7. The method of claim 6, further comprising transmitting a physical downlink shared channel (PDSCH) in the at least one subframe associated with the designated set of subframes for at least a subset of mobile entities served by the base station.

8. The method of claim 1, further comprising receiving an adaptive PUSCH transmission scheduled by a control signal using a new control region in one of the designated set of subframes based on the uplink H-ARQ timing relationship.

9. The method of claim 1, further comprising receiving a semi-persistent scheduling (SPS) transmission in the uplink subframe.

10. The method of claim 1, further comprising suspending a PUSCH transmission in an uplink subframe associated with one of the designated set of subframes based on an uplink H-ARQ timing relationship.

11. The method of claim 1, further comprising scheduling physical downlink control channel (PDCCH) signals using a legacy control region only in subframes other than the designated set of subframes to a mobile entity.

12. The method of claim 11, wherein scheduling the PDCCH signals further comprises maintaining a constant number of blind decoding operations for PDCCH signals irrespective of how many of designated set of subframes are devoid of PDCCH signals.

13. The method of claim 11, further comprising scheduling the PDCCH signals in a first subframe that includes information scheduling downlink data transmissions for a plurality of subframes to the mobile entity.

14. The method of claim 13, further comprising allocating a plurality of search spaces specific to the mobile entity in the first subframe, wherein each search space is based at least in part on a subframe index of the corresponding downlink data transmission.

15. An apparatus for managing downlink control signals from a base station of a wireless communications system (WCS) using a frequency and time denoted resource grid divided into subframes, the apparatus comprising:
means for receiving a first indication from a network entity of the WCS to maintain a designated set of subframes on a common carrier devoid of designated downlink control signals in transmissions from the base station;
means for providing a second indication in a wireless transmission to a mobile entity enabling identification of subframes in the designated set; and
means for receiving a physical uplink shared channel (PUSCH) transmission in an uplink subframe associated with the designated set of subframes based on an uplink hybrid automatic repeat request (H-ARQ) timing relationship.

16. An apparatus for managing downlink control signals from a base station of a wireless communications system (WCS) using a frequency and time denoted resource grid divided into subframes, comprising:
at least one processor configured for receiving a first indication from a network entity of the WCS to maintain a designated set of subframes on a common carrier devoid of designated downlink control signals in transmissions from the base station, for providing a second indication in a wireless transmission to a mobile entity enabling identification of subframes in the designated set, and for receiving a physical uplink shared channel (PUSCH) transmission in an uplink subframe associated with the designated set of subframes based on an uplink hybrid automatic repeat request (H-ARQ) timing relationship; and
a memory coupled to the at least one processor for storing data.

17. The apparatus of claim 16, wherein the processor is further configured for maintaining the designated set of subframes devoid of the designated downlink control signals for a subset of mobile entities served by the base station.

18. The apparatus of claim 16, wherein the processor is further configured for maintaining the designated set of subframes devoid of the designated downlink control signals for all mobile entities served by the base station.

19. The apparatus of claim 16, wherein the processor is further configured for providing the second indication by indicating the designated set of subframes using cross-subframe scheduling.

20. The apparatus of claim 16, wherein the processor is further configured for maintaining the designated set of subframes devoid of the designated downlink control signals, wherein the designated downlink control signals are from a legacy control region.

21. The apparatus of claim 16, wherein the processor is further configured for scheduling downlink control signals from a new control region in at least one subframe associated with the designated set of subframes for at least a subset of mobile entities served by the base station.

22. The apparatus of claim 16, wherein the processor is further configured for receiving an adaptive PUSCH transmission scheduled by a control signal using a new control region in one of the designated set of subframes based on the uplink H-ARQ timing relationship.

23. The apparatus of claim 16, wherein the processor is further configured for receiving a semi-persistent scheduling (SPS) transmission in the uplink subframe.

24. The apparatus of claim 16, wherein the processor is further configured for suspending a PUSCH transmission in an uplink subframe associated with one of the designated set of subframes based on an uplink H-ARQ timing relationship.

25. The apparatus of claim 16, wherein the processor is further configured for scheduling physical downlink control channel (PDCCH) signals using a legacy control region only in subframes other than the designated set of subframes to a mobile entity.

26. The apparatus of claim 25, wherein the processor is further configured for scheduling the PDCCH signals by maintaining a constant number of blind decoding operations for PDCCH signals irrespective of how many of designated set of subframes are devoid of PDCCH signals.

27. The apparatus of claim 25, wherein the processor is further configured for scheduling the PDCCH signals in a first subframe that includes information scheduling downlink data transmissions for a plurality of subframes to the mobile entity.

28. The apparatus of claim 27, wherein the processor is further configured for allocating a plurality of search spaces specific to the mobile entity in the first subframe, wherein each search space is based at least in part on a subframe index of the corresponding downlink data transmission.

29. A computer program product for managing downlink control signals from a base station of a wireless communications system (WCS) using a frequency and time denoted resource grid divided into subframes on a common carrier, comprising:
 a computer-readable medium comprising code for receiving a first indication from a network entity of the WCS to maintain a designated set of subframes on a common carrier devoid of designated downlink control signals in transmissions from the base station, for providing a second indication in a wireless transmission to a mobile entity enabling identification of subframes in the designated set, and for receiving a physical uplink shared channel (PUSCH) transmission in an uplink subframe associated with the designated set of subframes based on an uplink hybrid automatic repeat request (H-ARQ) timing relationship.

30. A method for using downlink control signals on a common carrier at a mobile entity of a wireless communications system (WCS) using a frequency and time denoted resource grid divided into subframes, the method comprising:
 receiving an indication from a base station of the WCS; and
 identifying a designated set of subframes on a common carrier that are devoid of designated downlink control signals, using the indication; and
 transmitting a physical uplink shared channel (PUSCH) in an uplink subframe associated with one of the designated set of subframes based on an uplink hybrid automatic repeat request (H-ARQ) timing relationship.

31. The method of claim 30, wherein receiving the indication further comprises receiving cross-subframe scheduling indicative of the designated set of subframes.

32. The method of claim 30, further comprising receiving downlink control signals in a new control region in at least one subframe associated with the designated set of subframes.

33. The method of claim 32, further comprising receiving a physical downlink shared channel (PDSCH) in the at least one subframe associated with the designated subframes.

34. The method of claim 30, further comprising suspending retransmission that of requested repeat data in subframes connected with the designated set of subframes based on an H-ARQ timing relationship.

35. The method of claim 34, further comprising providing a positive acknowledgement (ACK) from a physical layer to a media access control (MAC) layer within the mobile entity to cause the suspending retransmission of requested repeat data.

36. The method of claim 30, further comprising retransmitting requested repeat data in at least one subframe connected with the designated set of subframes based on a H-ARQ timing relationship, via one of a cross-subframe physical hybrid ARQ indicator channel (PHICH) or a relay PHICH (R-PHICH).

37. The method of claim 30, further comprising transmitting an adaptive PUSCH transmission scheduled by a control signal using a new control region in an uplink subframe associated with the designated set of subframes based on the uplink H-ARQ timing relationship.

38. The method of claim 37, further comprising transmitting a semi-persistent scheduling (SPS) transmission in the uplink subframe.

39. The method of claim 30, further comprising receiving physical downlink control channel (PDCCH) signals using a legacy control region only in subframes other than the designated set of subframes; and
 performing a number of blind decoding operations according to a scheduling arrangement of the PDCCH signals.

40. The method of claim 30, further comprising performing a fixed number of blind decoding operations for PDCCH signals irrespective of how many designated sets of subframes are devoid of PDCCH signals.

41. The method of claim 40, further comprising receiving the PDCCH signals in a first subframe that includes information scheduling downlink data transmissions for a plurality of subframes to the mobile entity.

42. The method of claim 36, further comprising accessing a plurality of search spaces specific to the mobile entity in the first subframe, wherein each search space is based at least in part on a subframe index of the corresponding downlink data transmission.

43. An apparatus for using downlink control signals on a common carrier at a mobile entity of a wireless communications system (WCS) using a frequency and time denoted resource grid divided into subframes, the apparatus comprising:
 receiving an indication from a base station of the WCS;
 means for identifying a designated set of subframes on a common carrier that are devoid of designated downlink control signals, using the indication; and
 transmitting a physical uplink shared channel (PUSCH) in an uplink subframe associated with one of the designated set of subframes based on an uplink hybrid automatic repeat request (H-ARQ) timing relationship.

44. An apparatus for using downlink control signals on a common carrier at a mobile entity of a wireless communications system (WCS) using a frequency and time denoted resource grid divided into subframes, comprising:
 at least one processor configured for receiving an indication from a base station of the WCS, for identifying a designated set of subframes on a common carrier that are devoid of designated downlink control signals, using the indication; and for receiving a physical uplink shared channel (PUSCH) transmission in an uplink subframe associated with the designated set of subframes based on an uplink hybrid automatic repeat request (H-ARQ) timing relationship; and a memory coupled to the at least one processor for storing data.

45. The apparatus of claim 44, wherein the processor is further configured for receiving the indication by receiving cross-subframe scheduling indicative of the designated set of subframes.

46. The apparatus of claim 44, wherein the processor is further configured for receiving downlink control signals in a new control region in at least one subframe associated with the designated set of subframes.

47. The apparatus of claim 46, wherein the processor is further configured for receiving a physical downlink shared channel (PDSCH) in the at least one subframe associated with the designated subframes.

48. The apparatus of claim 44, wherein the processor is further configured for suspending retransmission of requested repeat data in subframes connected with the designated set of subframes based on an H-ARQ timing relationship.

49. The apparatus of claim 48, wherein the processor is further configured for providing a positive acknowledgement (ACK) from a physical layer to a media access control (MAC) layer within the mobile entity to cause the suspending retransmission of requested repeat data.

50. The apparatus of claim 44, wherein the processor is further configured for retransmitting requested repeat data in at least one subframe connected with the designated set of subframes based on a H-ARQ timing relationship, via one of a cross-subframe physical hybrid ARQ indicator channel (PHICH) or a relay PHICH (R-PHICH).

51. The apparatus of claim 44, wherein the processor is further configured for transmitting an adaptive PUSCH transmission scheduled by a control signal using a new control region in an uplink subframe associated with the designated set of subframes based on the uplink H-ARQ timing relationship.

52. The apparatus of claim 51, wherein the processor is further configured for transmitting a semi-persistent scheduling (SPS) transmission in the uplink subframe.

53. The apparatus of claim 44, wherein the processor is further configured for receiving physical downlink control channel (PDCCH) signals using a legacy control region only in subframes other than the designated set of subframes; and
performing a number of blind decoding operations according to a scheduling arrangement of the PDCCH signals.

54. The apparatus of claim 44, wherein the processor is further configured for performing a fixed number of blind decoding operations for PDCCH signals irrespective of how many designated sets of subframes are devoid of PDCCH signals.

55. The apparatus of claim 44, wherein the processor is further configured for receiving the PDCCH signals in a first subframe that includes information scheduling downlink data transmissions for a plurality of subframes to the mobile entity.

56. The apparatus of claim 55, wherein the processor is further configured for accessing a plurality of search spaces specific to the mobile entity in the first subframe, wherein each search space is based at least in part on a subframe index of the corresponding downlink data transmission.

57. A computer program product for using downlink control signals on a common carrier at a mobile entity of a wireless communications system (WCS) using a frequency and time denoted resource grid divided into subframes, comprising:

a computer-readable medium comprising code for receiving an indication from a base station of the WCS, for identifying a designated set of subframes on a common carrier that are devoid of designated downlink control signals, using the indication; and for receiving a physical uplink shared channel (PUSCH) transmission in an uplink subframe associated with the designated set of subframes based on an uplink hybrid automatic repeat request (H-ARQ) timing relationship.

* * * * *